US008862679B1

(12) United States Patent
Byttow et al.

(10) Patent No.: US 8,862,679 B1
(45) Date of Patent: Oct. 14, 2014

(54) DISPLAYING COMMENTS ON A SECRET IN AN ANONYMOUS SOCIAL NETWORKING APPLICATION

(71) Applicant: Secret, Inc., San Francisco, CA (US)

(72) Inventors: David Byttow, San Francisco, CA (US); Christopher Bader-Wechseler, San Francisco, CA (US)

(73) Assignee: Secret, Inc., San Francisco, CA (US)

( * ) Notice: Subject to any disclaimer, the term of this patent is extended or adjusted under 35 U.S.C. 154(b) by 0 days.

(21) Appl. No.: 14/264,946

(22) Filed: Apr. 29, 2014

Related U.S. Application Data

(60) Provisional application No. 61/981,736, filed on Apr. 18, 2014.

(51) Int. Cl.
*G06F 15/16* (2006.01)
*G06Q 10/10* (2012.01)

(52) U.S. Cl.
CPC .................................... *G06Q 10/101* (2013.01)
USPC ............................ 709/206; 709/205; 715/788

(58) Field of Classification Search
CPC ...................... H04L 29/06394; H04L 65/4007
USPC ................... 709/205, 206, 217, 219; 715/788
See application file for complete search history.

(56) References Cited

U.S. PATENT DOCUMENTS

| | | | | |
|---|---|---|---|---|
| 6,175,842 | B1 * | 1/2001 | Kirk et al. | 715/205 |
| 7,058,895 | B2 * | 6/2006 | Kautto-Koivula et al. | 715/744 |
| 7,313,766 | B2 * | 12/2007 | Kautto Kiovula et al. | 715/853 |
| 8,271,516 | B2 * | 9/2012 | Gounares et al. | 707/768 |
| 8,276,071 | B2 * | 9/2012 | Shuster et al. | 715/706 |
| 8,386,318 | B2 * | 2/2013 | Varadarajan et al. | 705/14.64 |
| 8,388,451 | B2 * | 3/2013 | Auterio et al. | 463/42 |
| 8,510,399 | B1 * | 8/2013 | Byttow et al. | 709/206 |
| 8,578,501 | B1 * | 11/2013 | Ogilvie | 726/26 |
| 8,589,792 | B2 * | 11/2013 | Shuster et al. | 715/706 |
| 8,606,703 | B1 * | 12/2013 | Dorsey et al. | 705/39 |
| 8,725,826 | B2 * | 5/2014 | Robinson et al. | 709/207 |
| 8,739,070 | B2 * | 5/2014 | Mullen | 715/834 |
| 2008/0147743 | A1 * | 6/2008 | Taylor et al. | 707/104.1 |
| 2008/0229215 | A1 * | 9/2008 | Baron et al. | 715/751 |
| 2009/0125521 | A1 * | 5/2009 | Petty | 707/9 |
| 2010/0070926 | A1 * | 3/2010 | Abanami et al. | 715/835 |

(Continued)

OTHER PUBLICATIONS

Bertier, Marin, et al. "The gossple anonymous social network." Proceedings of the ACM/IFIP/USENIX 11th International Conference on Middleware. Springer-Verlag, 2010.*

(Continued)

*Primary Examiner* — Jimmy H Tran
(74) *Attorney, Agent, or Firm* — Perkins Coie LLP

(57) ABSTRACT

Technology is directed to a social networking application for sharing secrets anonymously. A user can share content ("secret") with other users of the social networking application anonymously. The other users may not know who posted the secret. A secret can include multimedia content, e.g., text or an image. Users can "love"/"heart" and/or comment on a secret. The social networking application assigns an unique avatar to each of the users who comment on a secret. In some embodiments, the avatars are assigned on random basis. An author of the secret is assigned a specific avatar. In some embodiments, authors of any of the secrets are assigned the same specific avatar. Each of the comments is displayed with an avatar assigned to the user who posted the corresponding comment. The avatars can also be assigned based on a theme, occasion, etc.

10 Claims, 21 Drawing Sheets

(56) References Cited

U.S. PATENT DOCUMENTS

| | | | | |
|---|---|---|---|---|
| 2011/0173261 | A1* | 7/2011 | McCallie, Jr. et al. | 709/204 |
| 2011/0213975 | A1* | 9/2011 | Sorniotti et al. | 713/169 |
| 2011/0271230 | A1* | 11/2011 | Harris et al. | 715/810 |
| 2012/0124482 | A1* | 5/2012 | Ray et al. | 715/751 |
| 2012/0290979 | A1* | 11/2012 | Devecka | 715/810 |
| 2012/0303659 | A1* | 11/2012 | Erhart et al. | 707/769 |
| 2012/0303727 | A1* | 11/2012 | Spat | 709/206 |
| 2013/0007149 | A1* | 1/2013 | Harris | 709/206 |
| 2013/0055089 | A1* | 2/2013 | Gundotra et al. | 715/733 |
| 2013/0067227 | A1* | 3/2013 | Derrick | 713/168 |
| 2013/0073982 | A1* | 3/2013 | Abouyounes | 715/752 |
| 2013/0080928 | A1* | 3/2013 | Zhuang et al. | 715/758 |
| 2013/0086484 | A1* | 4/2013 | Antin et al. | 715/751 |
| 2013/0091209 | A1* | 4/2013 | Bennett et al. | 709/204 |
| 2013/0110929 | A1* | 5/2013 | Gundotra et al. | 709/204 |
| 2013/0117301 | A1* | 5/2013 | Horling et al. | 707/769 |
| 2014/0052538 | A1* | 2/2014 | Foote et al. | 705/14.66 |
| 2014/0082078 | A1* | 3/2014 | Dunn et al. | 709/204 |
| 2014/0136617 | A1* | 5/2014 | Singer et al. | 709/204 |
| 2014/0164504 | A1* | 6/2014 | Dellenbach et al. | 709/204 |
| 2014/0173461 | A1* | 6/2014 | Shahade | 715/753 |

OTHER PUBLICATIONS http://www.4squarebadges.com/foursquare-badge-list/.*

* cited by examiner

DISPLAYING COMMENTS ON A SECRET IN AN ANONYMOUS SOCIAL NETWORKING APPLICATION

CROSS-REFERENCE TO RELATED APPLICATION(S)

This application claims the benefit of U.S. Provisional Patent Application No. 61/981,736, entitled "SHARING A SECRET IN A SOCIAL NETWORKING APPLICATION ANONYMOUSLY", filed on Apr. 18, 2014, which is incorporated by reference herein in its entirety.

TECHNICAL FIELD

At least one embodiment of the technique introduced here relates to a social networking application, and more particularly, to sharing a secret in the social networking application anonymously.

BACKGROUND

As social networking has become universal, people have become increasingly sensitive to what they share online. Speaking on a stage in front of a mixed audience of family, friends, and acquaintances makes it hard for the people to be their most authentic selves. As a result, people tend to share only their proudest moments in an attempt to portray their best selves. They often filter too much, and with that, may lose real human connection. People are not free to express themselves without holding back. It's not only speaking on a stage that's hard, it's also difficult choosing when to like, comment, and re-share other people's posts. Sometimes showing approval of controversial content can be embarrassing or intimidating.

Current social networking applications typically require the user to identify themselves. Every action of the user has a bearing on the image or the reputation of the user. As one's social networking applications becomes saturated, the person can feel very public. It puts the focus on managing the person's image, rather than truly bonding with people.

In this day and age, privacy and security are more important than ever. Most of the social networking applications upload the address book to connect the user with their friends. They also store the data as they have to match new friends that join the service long after you've uploaded your address book. But, even if a service doesn't store the contact information in a database, there are all sorts of other places it can go, such as into the logs that nearly all services keep for debug and analytical purposes. The data is there and it's discoverable, and therefore may lack privacy and security.

BRIEF DESCRIPTION OF THE DRAWINGS

FIG. 8, which includes

DETAILED DESCRIPTION

Introduced here is a technology for sharing secrets in a social networking application anonymously ("the technology"). A user can share content ("secret") with other users of the social networking application anonymously. The other users may not know who posted the secret. The secret does not include any identifying information, such as username of a user, an image of the user, contact information of the user, etc., that can identify the user who shared the secret. A secret can include multimedia content. In some embodiments, the multimedia content includes text, an image, an audio, a video or a combination thereof. Users can "love"/"heart" and/or comment on a secret. Users can "love"/"heart" and/or comment on a secret. The social networking application assigns a unique avatar to each of the users who comment on a secret. In some embodiments, the avatars are assigned on random basis. An author of the secret is assigned a specific avatar. In some embodiments, authors of any of the secrets are assigned the same specific avatar. Each of the comments is displayed with an avatar assigned to the user who posted the corresponding comment. The avatars can also be assigned based on a theme, occasion, etc.

Users can further share the secret on other social networking applications, e.g., Facebook, Twitter. Like for the user who posts a secret, anonymity is maintained for all types of users in the social networking application, including users who love and/or comment on the secret.

A secret posted by a user is delivered to a selected set of users, e.g., friends of the user. A delivery mechanism determines who the friends of the users are and shares the secret with some or all of the friends of the user. In some embodiments, the friends of a user are a set of individuals in the contacts list of the user, e.g., an address book of the user, who are also members of the social networking application. A friend to whom the secret is delivered is determined as a function of various factors, including one or more of number of comments made by the friend, a number of hearts the friend has received or given, a reputation of the friend, a time of the day, whether the friend is blocked by the user, a geographical location of the friend, etc.

Figure 1:
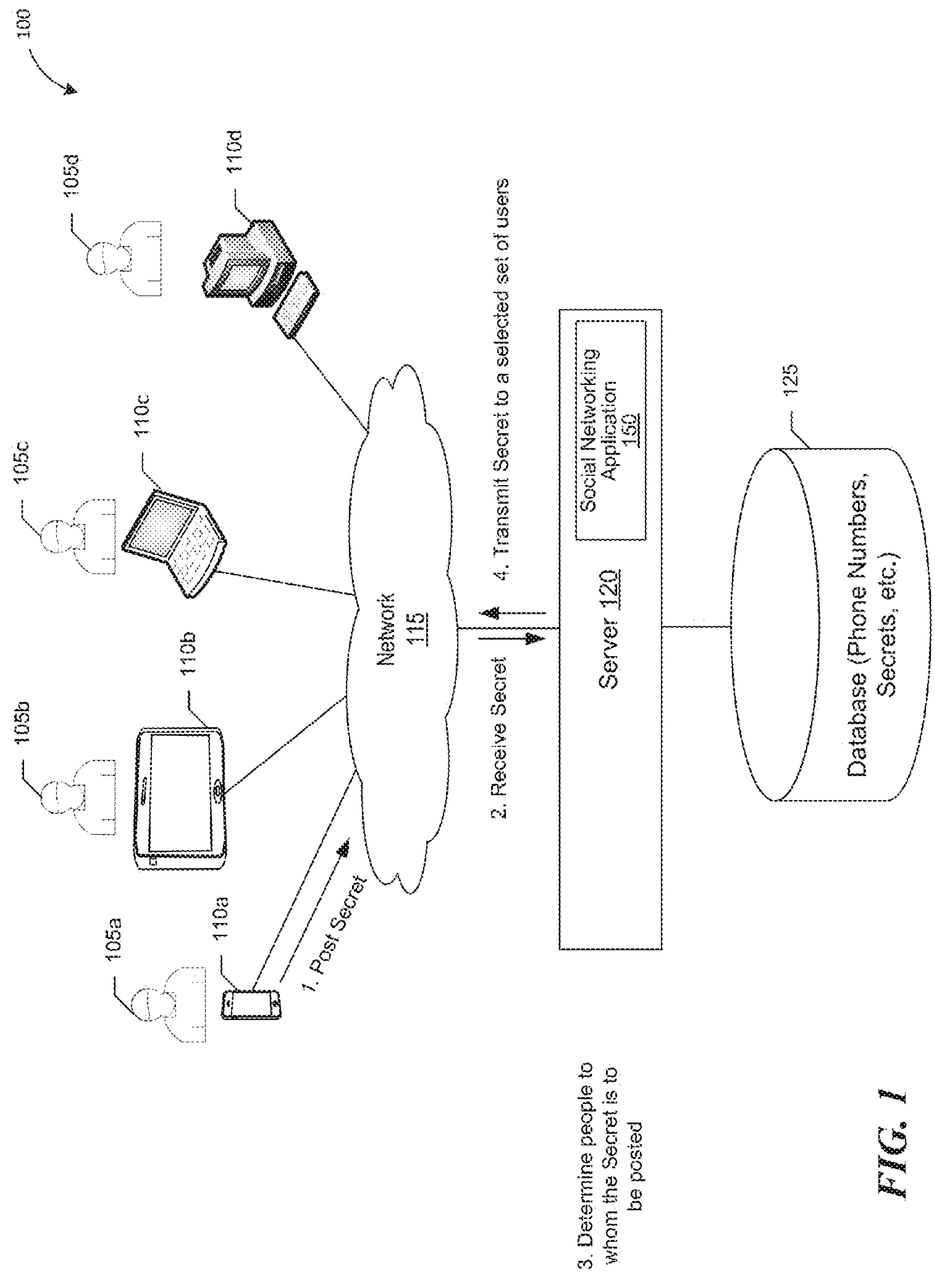
FIG. 1 is a block diagram illustrating an environment in which a social networking application for sharing secrets can be implemented.

FIG. 1 is a block diagram illustrating an environment 100 in which a social networking application for sharing secrets can be implemented. The environment 100 includes a server 120 on which a social networking application 150 that facilitates sharing secrets between a number of users, e.g., users 105*a-d*, is executing. In some embodiments, a portion of the social networking application 150, e.g., a server portion, executes on the server 120 and another portion of the social networking application 150, e.g., a client portion, executes on the user device. The social networking application 150 can be implemented in various configurations. For example, the social networking application 150 can be implemented as an online service which can be accessed by users via an application such as a web browser. In another example, the social networking application 150 can be implemented as a downloadable application, e.g., a mobile application, that can be executed on user devices 110*a-d*. In some embodiments, the downloaded mobile application can be the client portion of the social networking application 150.

The user devices 110*a-d* can be a computing device such as a smartphone, tablet, laptop, desktop, wearable electronic gadgets, automobiles with integrated computing devices, etc. The user devices 110*a-d* can be any computing device that is capable of providing users access to the social networking application 150. The user devices communicate with the server over a network 115, such as Internet, local area network (LAN), wireless LAN, wide area network (WAN) etc.

A user, such as user 105*a*, posts a secret to the social networking application 150, e.g., using the mobile application executing on the user device 110*a*. The server 120 receives the secret from the user 105*a* and determines a list of friends or followers of the user 105*a* to whom the secret should be delivered. After the list of friends is determined, the server 120 posts the secret to the list of friends who can then view the secret, e.g., on a news feed of the social networking application 150. In some embodiments, a news feed is a portion of the graphical user interface (GUI) of the social networking application 150 where the users 105*a-d* can view the secrets shared by the user 105*a* and/or other users. The secrets are shared between the users 105*a-d* anonymously. That is, the secrets may not have any user identification information, such as username, an image of the user, contact details, etc., that can identify the user. The anonymity is maintained for all the users, e.g., a user who posts the secret, comments on the secret and/or loves the secret.

Figure 2:
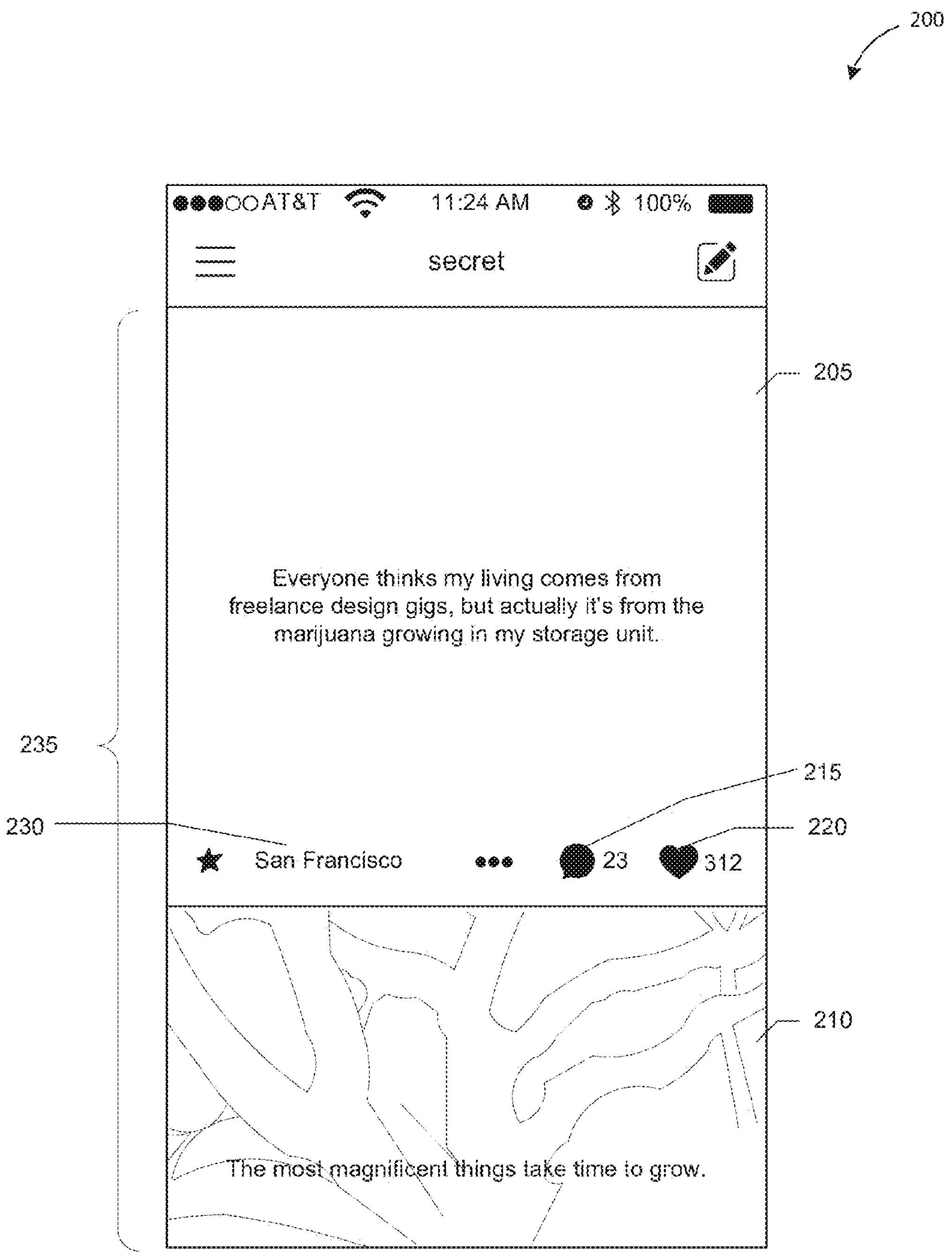
FIG. 2 is an example graphical user interface (GUI) for displaying a secret.

FIG. 2 is an example first GUI 200 for displaying a secret. The first GUI 200 displays a number of secrets, such as a first secret 205 and a second secret 210 shared by one or more of users such as users 105*a-d*. The user 105*a* can view the first GUI 200 on the user device 110*a*. The first secret 205 includes text that reads as "Everyone thinks my living comes from freelance design gigs, but actually it's from the marijuana growing in my storage unit." The user 105*a* may view more secrets by scrolling the news feed 235. A secret can have a colored background or an image background. Note that the first secret 205 has a colored background and the second secret 210 has an image background.

Each of the secrets displayed in the news feed 235 includes a comment GUI element that enables the user 105*a* to comment on a secret and a heart GUI element that enables the user to "love"/"heart" the secret indicating that the user likes the secret. For example, the first secret 205 includes a comment GUI element 215 that enables the user 105*a* to comment on the first secret 205 and a heart GUI element 220 that enables the user to "love"/"heart" the first secret 205. In some embodiments, the secret can include a tag that indicates a general identification of the user who posted the secret, such as "Friend," "Friend of the friend," "Your Circle." In some embodiments, the tag can include a location of the user who posted the secret, such as a city, e.g., San Francisco, or state, e.g., California. For example, the first secret 205 includes a tag 230 that indicates a city of the user who posted the first secret 205. The general identification tags to be displayed on the secret are determined based on various general identification tag criteria, including a number of friends the user 105*a* has. For example, if the number of friends the user 105*a* has is below a particular threshold, the general identification tag displayed on the secret can be "Your Circle."

Referring back to FIG. 1, a delivery mechanism of the social networking application 150 determines who the friends/followers of a user, e.g., user 105*a*, are and shares the secret posted by the user 105*a* with some or all of the friends of the user 105*a*. In some embodiments, the friends of the user 105*a* are individuals (also referred to as "contacts") in a contacts list of the user 105*a*, e.g., an address book of the user 105*a*, who are also members of the social networking application 150. When the user 105*a* signs up for the social networking application 150, contact information of the user 105*a* and the contacts in the address book of the user 105*a*, e.g., address book on the user device 110*a*, are uploaded to the server 120. In some embodiments, the contact information includes a phone number and/or an email ID of an entity. The contact information of the contacts may be hashed locally before uploading to the server 120 so that the contacts are anonymous to the server 120. The hashing may be performed using a salt. In cryptography, a salt is random data that is used as an additional input to a one-way function that hashes data, e.g., password or passphrase.

In some embodiments, the function of a salt is to defend against dictionary attacks and pre-computed rainbow table attacks. A new salt can be randomly generated for contact information of each contact. When the contact information is hashed with the salt, a phone number such as [+15552786005] can become hashed data such as [a22d75c92a630725f4] and the hashed data is sent to the server 120. The original phone number of the contact may not be uploaded from the user device. While only hashed data of the contact information of the contacts of the user 105*a* is uploaded to the server 120, the contact information of the user 105*a* may be uploaded in both hashed and non-hashed format.

The communication between the user devices 110*a-d* and the server 120 can be secured using a secure communication protocol. In some embodiments, the user devices 110*a-d* transmit the contact information to the server 120 using a cryptographic protocol such as secure socket layer (SSL).

Figure 3:
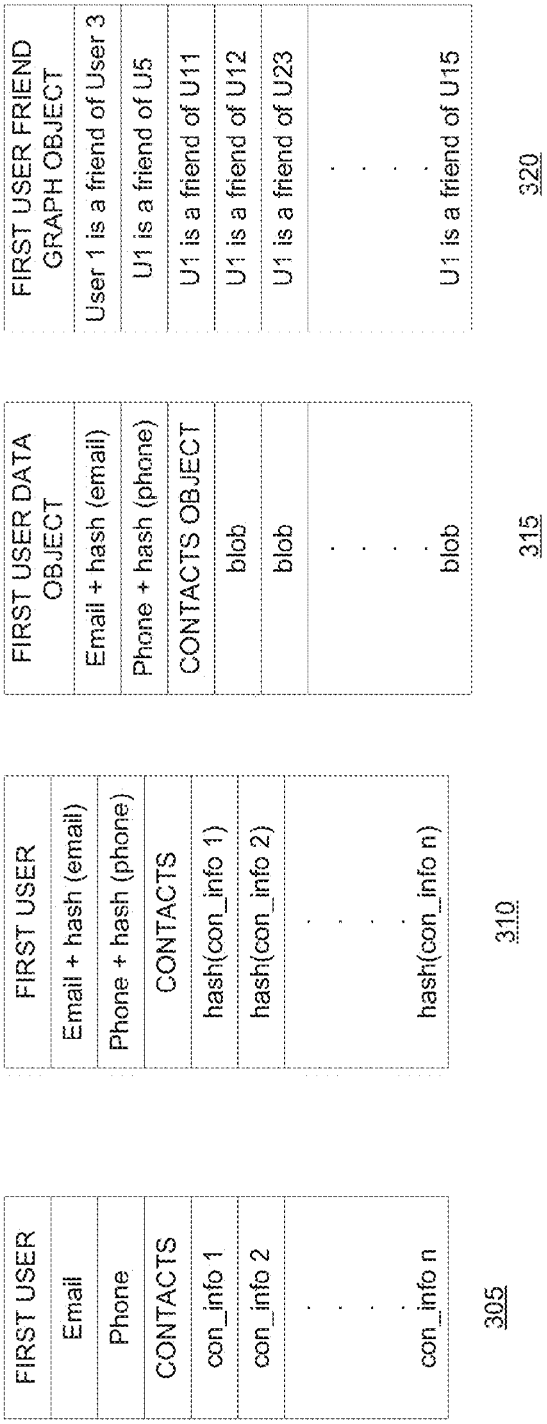
FIG. 3 is a block diagram of a representation of contact information of a user and contacts of the user.

FIG. 3 illustrates a block diagram of a representation of contact information of a new user, such as user 105*a*, and the contacts of the user 105*a*. The contact object container 305 represents the contact details of the user 105*a* and the contacts of the user 105*a* as stored on the computing device 110*a*. A client portion of the social networking application 150, e.g., social networking app, executing on the computing device 110*a* hashes the contact information of the user 105*a* and the contacts of the user 105*a* as illustrated by hashed object container 310. The client portion then transmits the hashed object container 310 to the server 120.

After the server 120 receives the contact information of the user 105*a* and the contacts of the user 105*a* in the address book, the server 120 stores the contact information as a user data object, e.g., as illustrated by user data object 315. The user data object 315 stores the contact information of the user 105*a* in both hashed and non-hashed format as shown in FIG. 2. The user data object 315 stores the contact information of the contacts of the user 105*a* in a contact data object. The contact data object stores the contact information of each of the contacts of the user 105*a* as hashed data. In some embodiments, the server 120 stores the hashed data of the contacts as binary large objects ("BLOBs"). The user data object 315 may be stored in a storage medium 125 associated with the server 120, e.g., as a database. The client portion of the social networking application 150 performs the process of uploading the contact information of the users 105*a-d* and the users' contacts, and creating a user data object for each of the users 105*a-d* who sign up with the social networking application 150.

When the user 105*a* signs up with the social networking application 150, the server 120 determines if any of the contacts of the user 105*a* are also in the social networking application 150. The server 120 compares the hashed data of the contact information of each of the contacts of the user 105*a* with hashed contact information of all other users who have signed up with the social networking application 150 to determine if there is any match. If there is a match between hashed contact information of a particular contact of the user 105*a* and the hashed information of a particular user in a user data object corresponding to the particular user, then the server 120 determines that the user 105*a* is "a friend of" or "a follower of" the particular contact in the social networking application 150. After identifying all the friends of the user 105*a*, the server 120 generates a friend graph object containing the hashed data of the contact information of the friends of the user 105*a*, e.g., as illustrated by friend graph object 320. The server 120 generates a friend graph object for each of the users in the social networking application 150.

Referring back to the delivery mechanism for the secrets, when the user 105*a* posts a secret, the server 120 determines a list of friends of the user 105*a*, e.g., using the friend graph object 320. The server 120 may then send the secret to the friends of the user 105*a*. In some embodiments, the server 120 may send the secret to a subset of the friends of the user 105*a*. The server 120 determines the subset of friends based on a function of various factors, including one or more of number of comments made by the friend, a number of hearts the friend has received or given on a particular secret, a reputation of the friend, a time of the day, whether the friend has blocked the user, whether the friend is blocked by the user, a geographical location of the friend, etc.

Further, the secret can be sent to different friends at different times. For example, a secret posted by the user 105*a* may not be shared with a friend of the user 105*a* until the friend receives a predetermined number of "hearts" or "loves" on his/her secret or has given a predetermined number of "hearts" or "loves" on secrets posted by other users. After the subset of friends is determined, the server 120 transmits the secret to the subset of the friends. The friends may then see the secret on the news feed of the social networking application 150.

Figure 4:
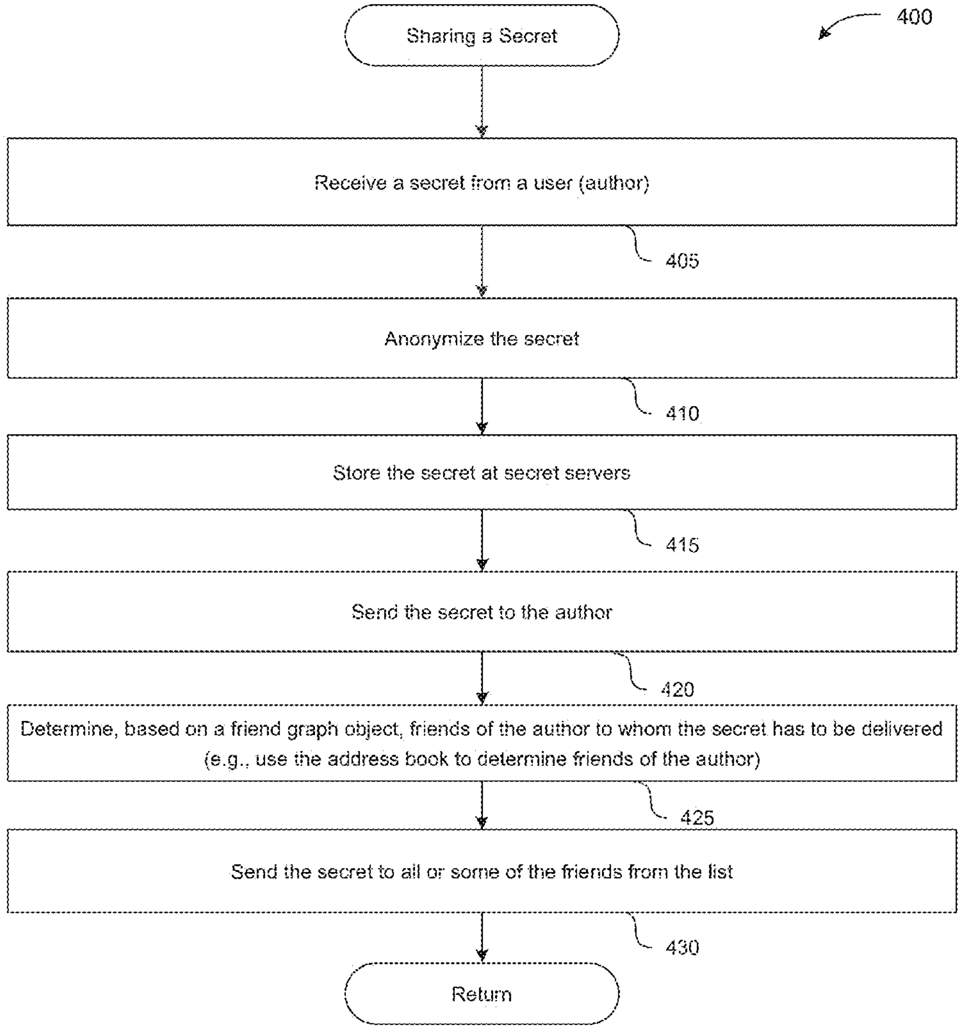
FIG. 4 is a flow diagram of a process for sharing secrets in the social networking application.

FIG. 4 is a flow diagram of a process 400 for sharing secrets in the social networking application 150. In some embodiment, the process 400 may be performed in the environment of FIG. 1. At step 405, the social networking application 150 receives a secret from a user (a.k.a. as an "author"). The author may input the secret to the social networking application 150 in various ways. For example, the author may input the secret input using the client portion, such as a mobile application, of the social networking application 150. In another example, the author may input the secret by emailing, tweeting, or texting into the social networking application 150. In yet another example, the author may input the secret by posting the secret to the social networking application 150 from a third party application. The third party application may transmit the secret to the social networking application 150 via an application programming interface (API) provided by the social networking application 150.

At step 410, the server 120 anonymizes the secret. In some embodiments, anonymizing a secret can include isolating user identification from the secret. The server 120 may extract the user identification information from the secret and then deliver the secret without the user information. The server 120 can store the user identification information associated with the secret separate from the secret on the database. In some embodiments, a user has the option to delink himself/herself from the secret the user has posted, in which case a source of the secret may not be discoverable by any entity, including the social networking application.

At step 415, the server 120 stores the secret at the storage medium 125, e.g., in a database. At step 420, the server 120 transmits the secret to the author. The author can view the secret on the news feed of the social networking application 150. At step 425, the server 120 determines the friends of the author to whom the secret has to be delivered, e.g., as described above at least with reference to FIG. 3 and FIG. 1. At step 430, the server 120 transmits the secret to at least some of the friends of the author.

Figure 5:
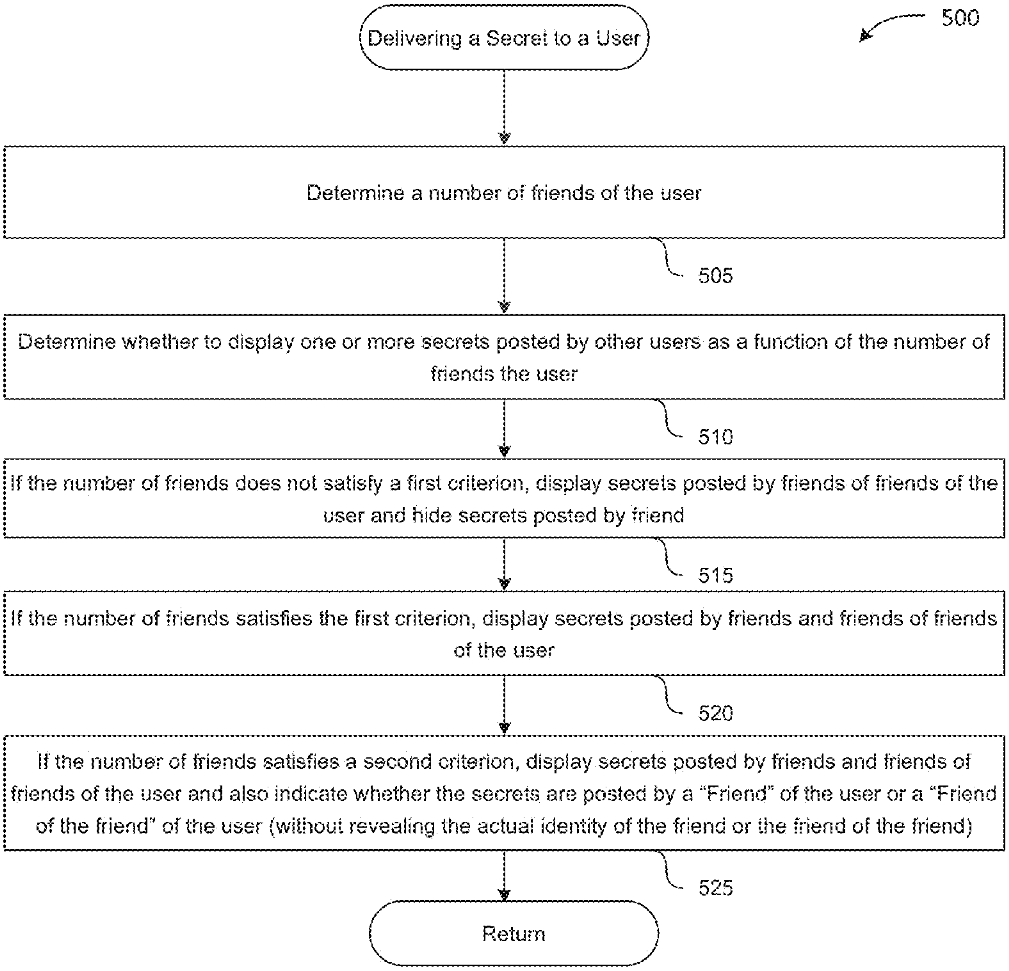
FIG. 5 is a flow diagram of a process for delivering secrets to a user.

FIG. 5 is a flow diagram of a process 500 for delivering secrets to a user. The process 500 can be executed in the environment 100. At step 505, the server 120 determines a number of friends of the user. At step 510, the server 120 determines whether to transmit secrets to the user as a function of the number of friends the user has. At step 515, if the user does not satisfy a first criterion, the server may not transmit some of the secrets to the user. For example, if the number of friends the user has is lesser than a first threshold, the server 120 may not transmit secrets that are posted by the friends of the user to the user. Instead, the server 120 may transmit secrets that are posted by a friend of the friend of the user.

In some embodiments, the fewer "friends" a user has on the social networking application 150, the lesser is the number of secrets displayed to the user. In some embodiments, this is done to avoid simple tricks to isolate individuals and their secrets. Further, the general identification tag displayed in association with the secret when the user does not satisfy a first criterion can be general as "Your Circle." The user may not know whether a friend of the user or a friend of the friend of the user has posted the secret.

If the number of friends satisfies the first criterion, at step 520, the server displays the secrets posted by the friends of the user as well as by friends of the friends of the user. For example, if the number of friends the user has is more than a first threshold but lesser than a second threshold, the server 120 may transmit secrets that are posted by the friends of the user and friends of the friends of the user to the user. Further, the general identification tag displayed in association with the secret can be general as "Your Circle." The user may not know whether a friend of the user or a friend of the friend of the user has posted the secret.

At step 525, the server 120 determines whether the number of friends satisfies a second criterion. If the number of friends satisfies the second criterion, the server 120 transmits the secrets posted by the friends of the user as well as by friends of the friends of the user and displays in the general identification tag associated with the secrets whether a particular secret is from a "Friend" or "Friend of the friend." For example, if the number of friends the user has is greater than the second threshold, the server 120 may transmit secrets that are posted by the friends of the user and friends of the friends of the user to the user and can also display the general identification tag in association with the secret that identifies whether the secret is from a "Friend" or "Friend of the friend." However, the social networking application 150 does not reveal the identity of the friend or the friend of the friend at any point in time.

Figure 6:
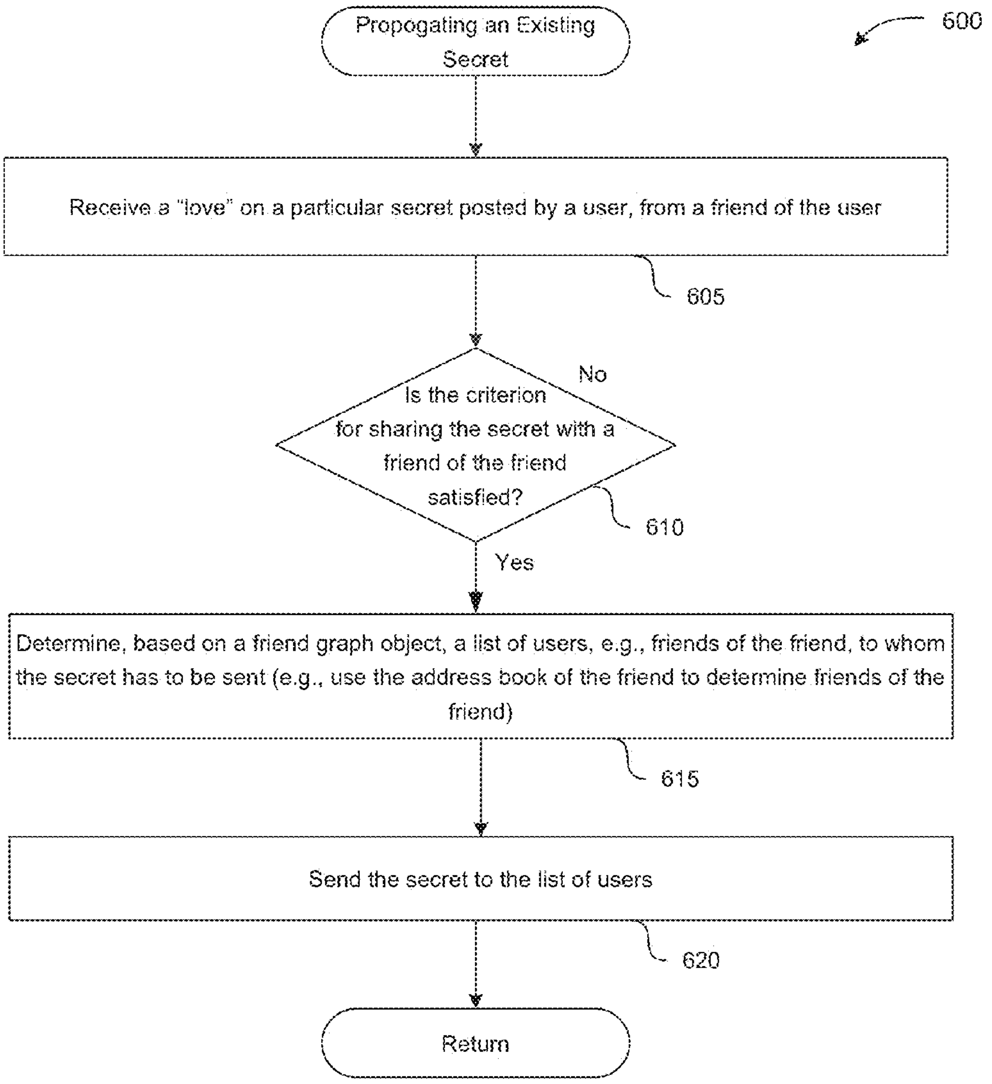
FIG. 6 is a flow diagram of a process for propagating an existing secret to the users in the social networking application.

FIG. 6 is a flow diagram of a process for propagating an existing secret to users, in the social networking application 150. The process 600 may be executed in the environment 100. At step 605, a secret posted by an author receives a "love" or a "heart" from a friend of the user. At step 610, the server 120 determines whether a criterion for sharing the secret with friends of the friend is satisfied. In some embodiments, the criterion for sharing the secret with friends of the friend is satisfied when the secret receives a predetermined number of hearts. Responsive to a determination that the criterion for sharing the secret with friends of the friend is satisfied, at step 615, the server 120 determines the friends of the friend of the user, e.g., using the a friend graph object of the friend of the user, as described at least with reference to FIGS. 1 and 3.

At step 620, the server 120 may then send the secret to some or all of the friends of the friend. The secret may continue to be propagated to various degrees of connections of the friends as a particular user hearts or loves the secret. In some embodiments, if the secret a particular user is viewing is posted by a user who is beyond 2 degrees of connection to the particular user, that is, beyond a friend of a friend of a friend of the particular user, the general identification tag displays a location, e.g., a state, a city or a geographical distance of the user who posted the secret.

Though the process 600 describes the criterion for determining whether to share the secret with the friends of the friend is based on a number of hearts the secret receives, the criterion can be based on various other factors, e.g., an amount of time that has elapsed since the secret was posted to the social networking application 150, etc.

Figure 7:
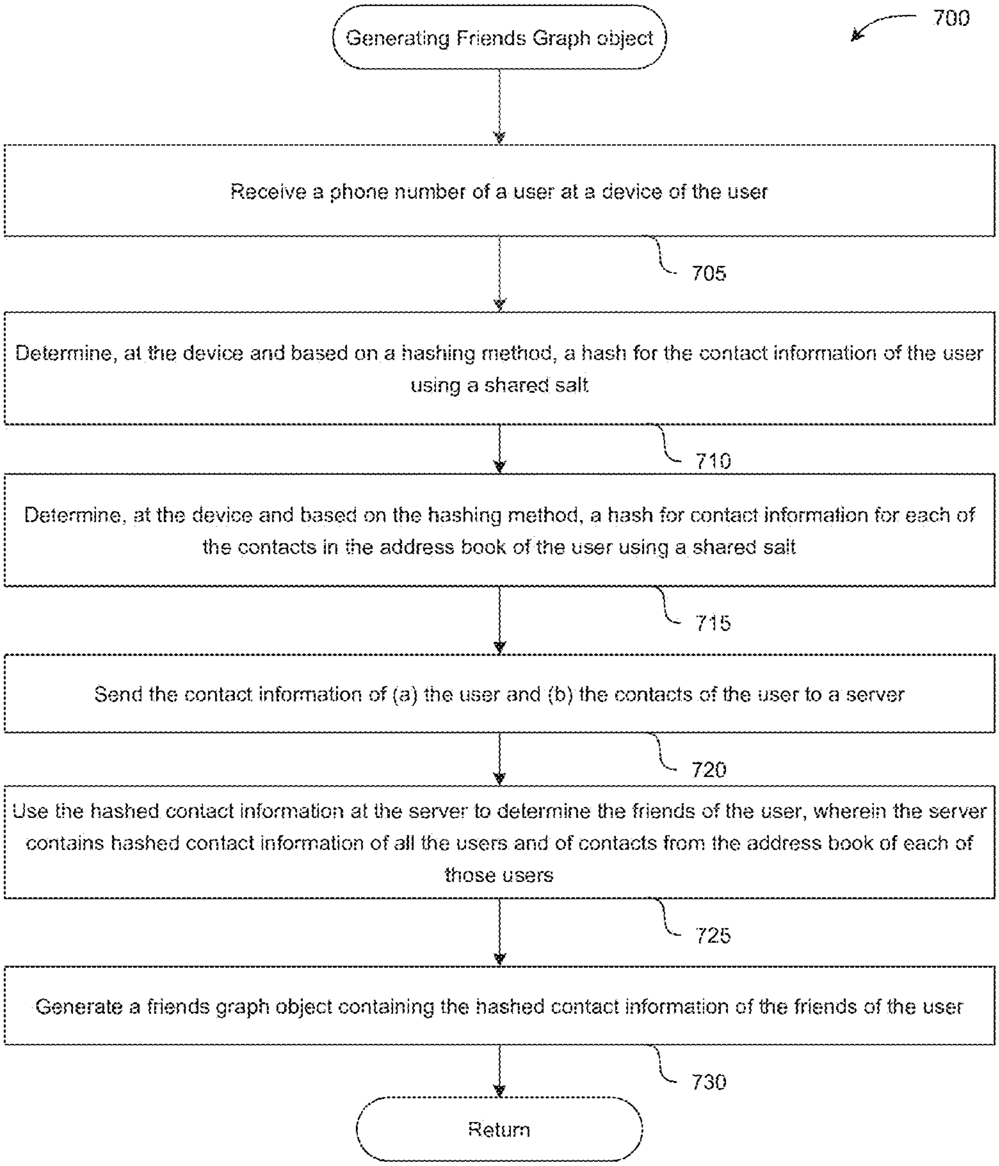
FIG. 7 is a flow diagram of a process for generating a friends graph object having a list of friends of a user.

FIG. 7 is a flow diagram of a process 700 for generating a friends graph object having a list of friends of a user. The process 700 may be executed in an environment 100. At step 705, the social networking application 150, e.g., the client portion of the social networking application 150 executing on a user device, receives contact information of the contacts of the user. In some embodiment, the contacts can be a list of individuals in an address book of the user on the user device.

At step 710, the client portion hashes the contact information of the user and the contacts of the user. The hashing may be performed using a shared salt (that is shared with the server 120). When the contact information is hashed with the salt, a phone number such as [+15552786005] becomes hashed data such as [a22d75c92a630725f4].

At step 715, the client portion similarly hashes the contact information of the contacts of the user. The original phone number and/or email of the contact may not be uploaded from the user device.

At step 720, the client portion transmits the hashed contact information of the user and the contacts of the user to the server 120. While only hashed data of the contact information of the contacts is uploaded to the server 120, the contact information of the user who signed up may be uploaded in both hashed and non-hashed format.

At step 725, after the server 120 receives the contact information of the user and the contacts of the user, the server 120 determines if any of the contacts of the user are also registered with/members of the social networking application 150. The server 120 compares the hashed data of the contact information of each of the contacts of the user with hashed contact information of all other users in the social networking application 150 to determine if there is any match. If there is a match between the hashed contact information of a particular contact of the user and the hashed information of a particular user in the social networking application 150, the server 120 determines that the user is "a friend of" or "a follower of" the particular contact.

At step 730, after identifying all the friends of the user, the server 120 generates a friend graph object containing the hashed data of the contact information of the friends. The server 120 generates a friend graph object for each of the users in the social networking application 150.

Figure 8A:
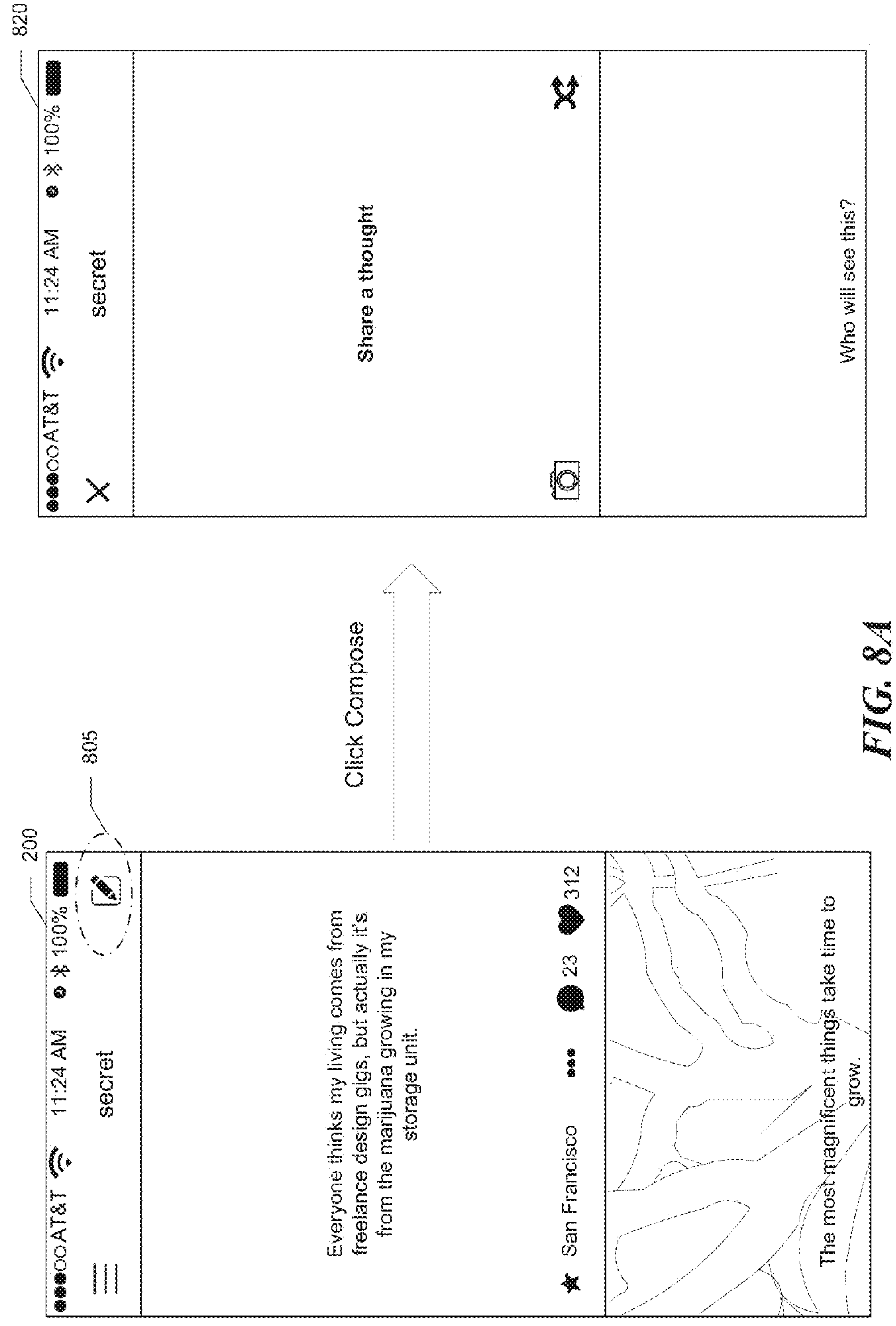
FIGS. 8A, 8B, 8C and 8D, is an example of GUIs for posting a secret to the social networking application of FIG. 1.

FIG. 8, which includes FIGS. 8A-8D, is an example of GUIs for posting a secret to a social networking application 150 of FIG. 1. FIG. 8A illustrates a news feed of a first GUI 200 of the social networking application 150 where secrets posted by the users are displayed. The GUIs of FIG. 8 can be displayed on a user device such as the user devices 110*a-d*. Users can comment and/or "love" or "heart" the secret using the comment and/or heart GUI elements associated with the secret. A user can compose a new secret from the first GUI 200. For example, the user can select compose GUI element 805 in the first GUI 200 to compose a secret. On selecting the compose GUI element 805, the client portion of the social networking application 150, e.g., a mobile app executing on the user device, displays the second GUI 820 for composing the secret.

Figure 8B:
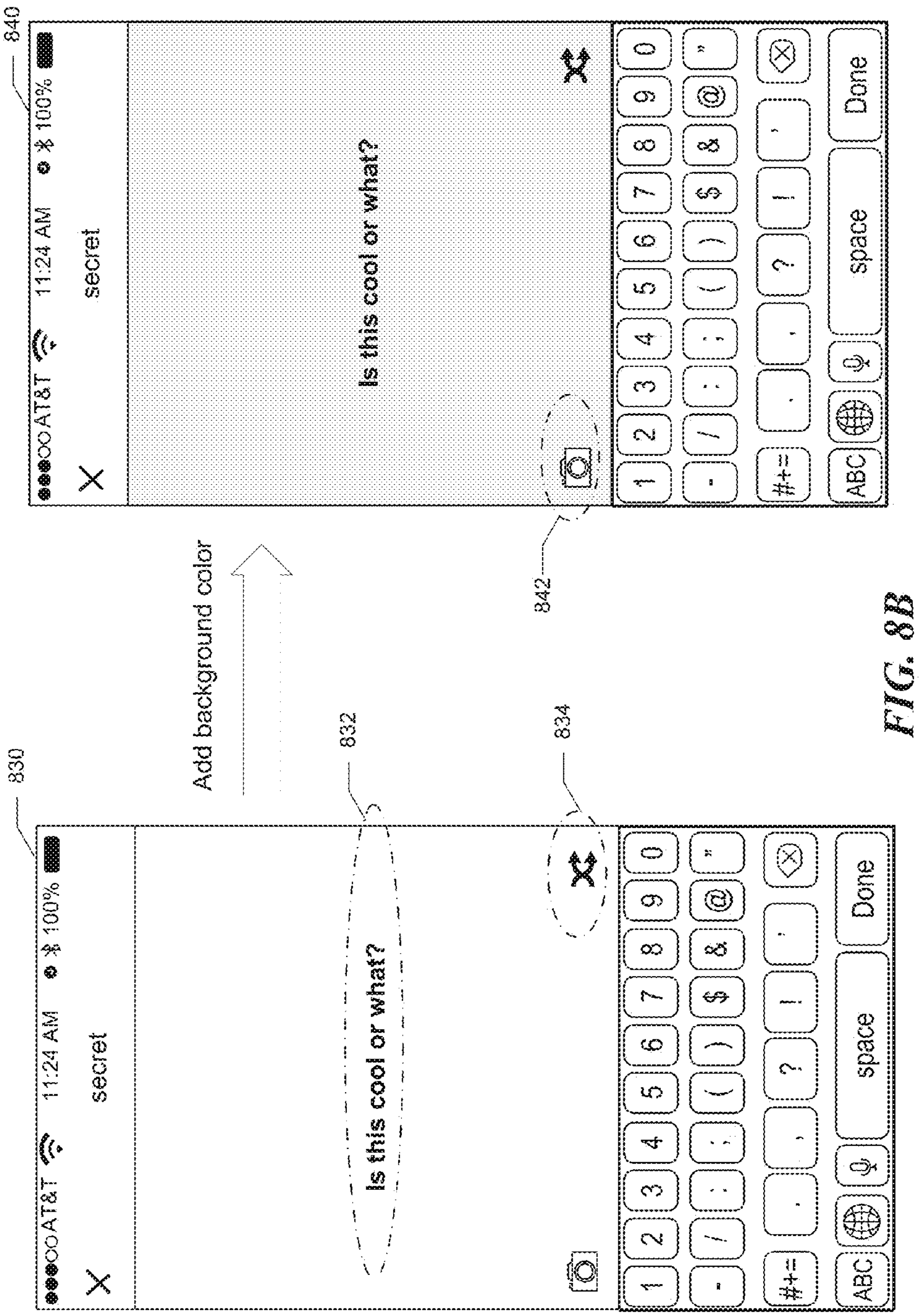

The user can compose the secret by inputting the text of the secret 832 as shown in third GUI 830 of FIG. 8B. The user can also add a color background to the secret. For example, the user can select the color background GUI element 834 to add color to the background as shown in fourth GUI 840. In some embodiments, selecting the color background GUI element 834 switches the colors in the background in a random order. The color background can be changed using various user interactions. For example, the color background can be changed by finger swipe gestures (e.g., swipe from left/right of the screen to right/left of the screen). A texture of the color background can be changed by another type of finger swipe gestures. For example, by swiping from top/bottom of the screen to bottom/top of the screen.

Figure 8C:
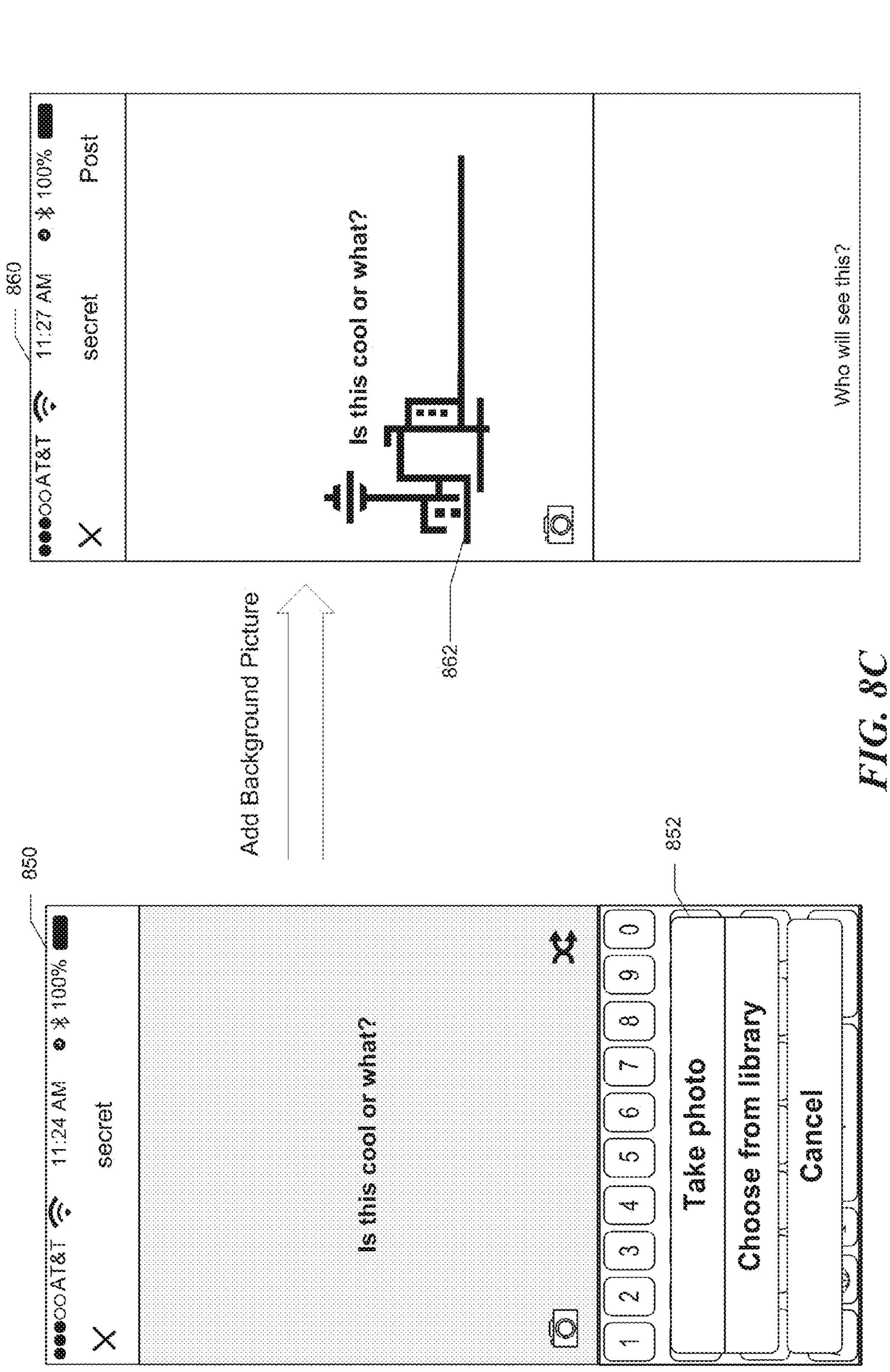

FIG. 8C illustrates inputting an image as a background to the secret. The user can add an image to the background of the secret 832. For example, the user can select the image background GUI element 842 to add an image to the secret. The mobile application displays the fifth GUI 850 on selection of the image background GUI element 842. The user may use the image selection tool 852 to add the image to the background of the secret. The sixth GUI 860 shows an image 862 added to the background of the secret.

Figure 8D:
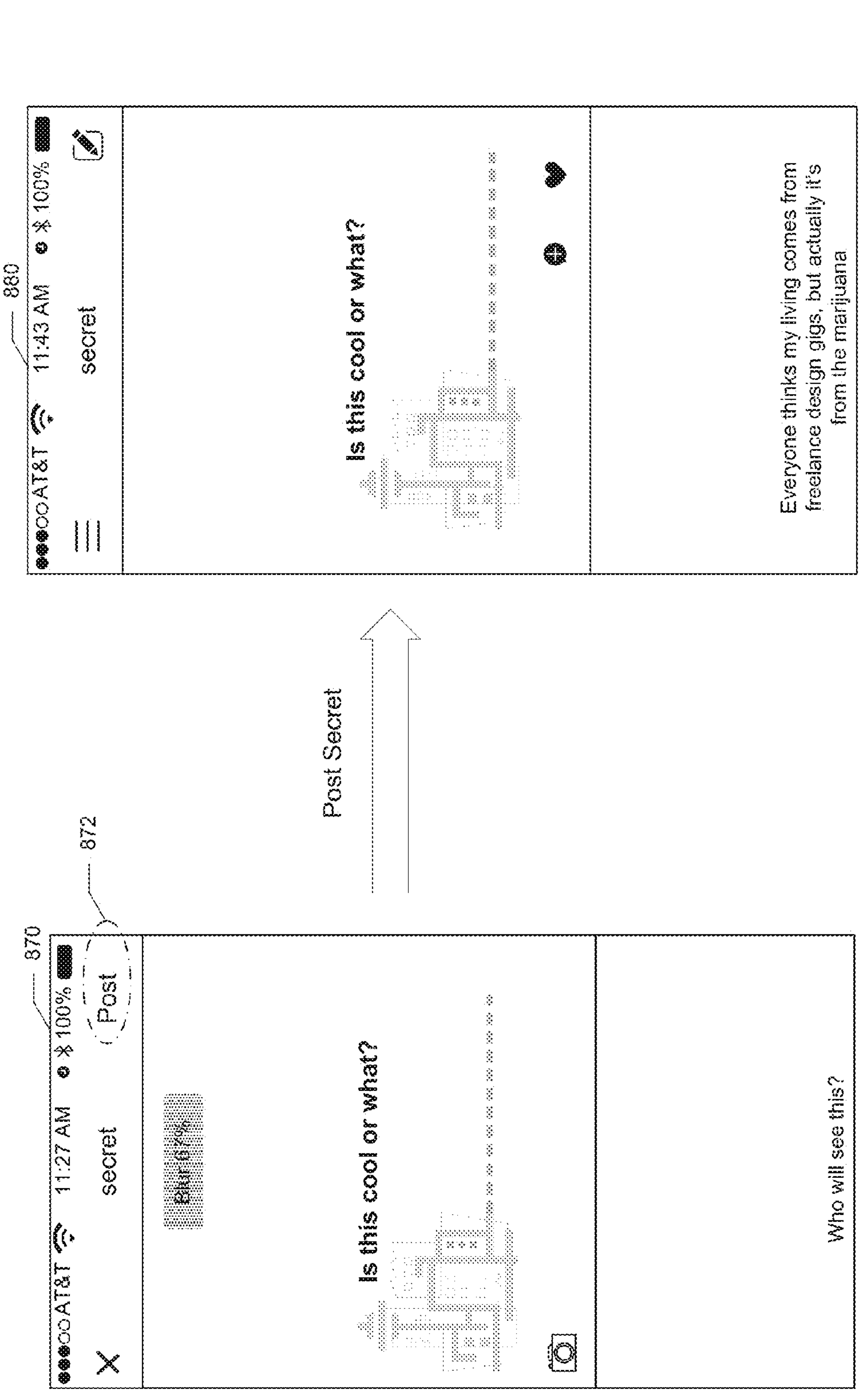

FIG. 8D illustrates editing an image background of the secret. The image 862 added to the background of the secret can be edited in various ways, e.g., blurred or dimmed. The editing operations can be performed using various user interactions. For example, the image can be blurred by finger swipe gestures (e.g., swipe from left/right of the screen to right/left of the screen), as illustrated in seventh GUI 870. In some embodiments, the image can be dimmed or brightened by finger swipe gestures (e.g., swipe from top/bottom of the screen to bottom/top of the screen).

When the user is ready to post the secret, the user may do so by selecting the posting GUI element such as the posting GUI element 872 in seventh GUI 870. After the user posts the secret, the secret can be viewed in the news feed of the mobile application, e.g., as illustrated in an eighth GUI 880. While the secret is presented on the news feed of the user substantially instantaneously, the social networking application 150 may transmit the secret to the friends of the user at a later time, e.g., based on the delivery mechanism described above.

Figure 9:
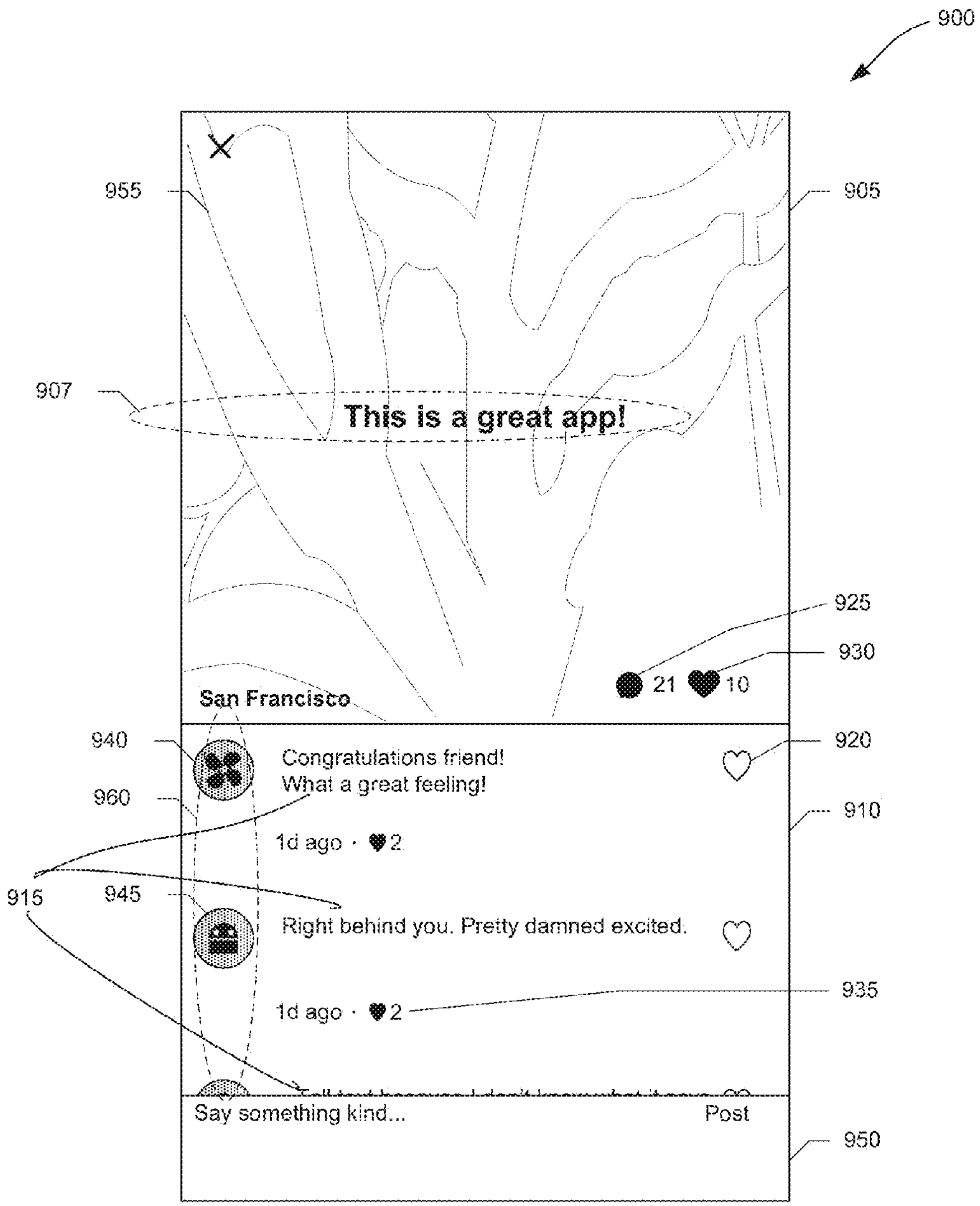
FIG. 9 is an example GUI for displaying a secret and comments posted on the secret.
Figure 10:
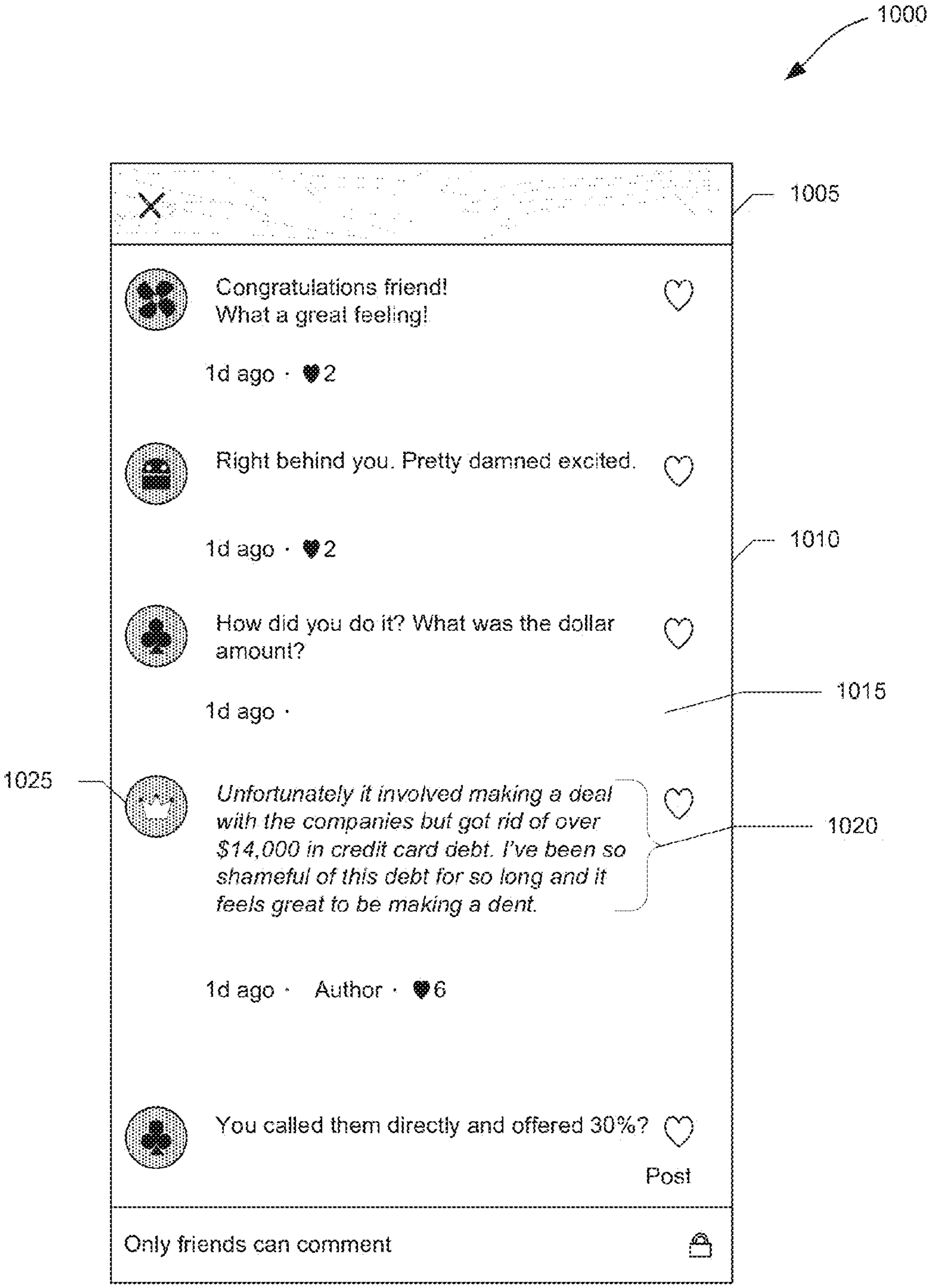
FIG. 10 is an example GUI for displaying comments posted on a secret of FIG. 9.

FIGS. 9 and 10 are example GUIs for displaying comments posted on a secret in a social networking application 150 of FIG. 1. FIG. 9 is an example of ninth GUI 900 for displaying a secret 907 and the comments 915 posted on the secret 907. FIG. 10 is an example tenth GUI 1000 for displaying the comments 1015 posted on the secret 907 of FIG. 9. Users can comment on a secret, e.g., using a comment GUI element 925. The comment can include text. The comment is displayed with an icon or an avatar assigned/associated with the user who posted the comment. In some embodiments, an avatar is a graphical representation of the user or the user's alter ego or character. The avatar may take either a three-dimensional form, as in games or virtual worlds, or a two-dimensional form as an icon in Internet forums and other online communities. The avatar can be an object representing the user. The term "avatar" can also refer to the personality connected with the screen name, or handle, of the user. However, the avatars displayed in association with the comments do not reveal the identity of the users who posted the comments.

The ninth GUI 900 illustrates comments 915 displayed with their associated avatars 960. Note that the avatars 960 do not reveal any identity of the users. Each user who comments on a particular secret is assigned a unique avatar from a list of avatars available at the server 120 based on an avatar selection policy. That is, each user is assigned an avatar from the list of available avatars that is not already assigned to any of other users who have commented on the particular secret. However, in some embodiments, the avatars are unique to the users for the comments on the particular secret. That is, an avatar assigned to a user for posting comments on a first secret can be different from an avatar assigned to the user for posting comments on a second secret.

In some embodiments, the avatar selection policy assigns a unique avatar to the user by randomly selecting an avatar from the list of avatars. For example, when a user comments on the particular secret for the first time, the social networking application 150 randomly selects an avatar from the list of avatars that is not already assigned to any of the users who have commented on the particular secret and assigns the randomly selected avatar to the user.

In some embodiments, the avatar selection policy is configured to assign a unique avatar to the user by selecting the avatar from the list of avatars based on contents of the comment made by particular user. For example, when a user comments on the particular secret for the first time, the social networking application 150 analyses the comment to determine a particular category the comment can be classified into. The categories can be based on a theme, an occasion, etc. For example, if the comment is about "romance," the social networking application 150 can assign an avatar, e.g., a graphical representation of two "hearts," that relates to the theme "romance." In another example, if the comment is about cars, the social networking application 150 can assign an avatar, e.g., a graphical representation of a car, that relates to the theme "cars." The social networking application 150 can various avatars for a particular category.

In some embodiments, the avatar selection policy is configured to assign a unique avatar to the users by selecting the avatars from the list of avatars based on contents of a secret on which the users are commenting. The social networking application 150 analyses the secret to determine a particular category the secret can be classified into. The categories can be based on a theme, an occasion, etc. For example, if the secret is about "food," the social networking application 150 can assign avatars that relate to the theme "food," e.g., a graphical representation of various types of food, to the users who comment on the secret. In another example, if the secret is about "fitness," the social networking application 150 can assign avatars that relate to the theme "fitness," e.g., a graphical representation of various activities or things associated with "fitness," to the users commenting on the secret.

Once a user is assigned a unique avatar for commenting on a particular secret, subsequent comments from the user for the particular secret may have the same avatar.

In the ninth GUI 900, the comment "Congratulations, friend! . . . " on the secret 907 is made by a first user and the comment "Right behind you . . . ." is made by a second user. Accordingly, each of these two users is assigned an unique avatar. For example, the first user is assigned a first avatar 940 and the second user is assigned a second avatar 945. The comments from the first and the second user are associated with their avatars and then displayed with the associated avatars. In the tenth GUI 1000, the comments "How did you do it? . . . " and "You called them directly . . . " on the secret 907 are made by the same user and therefore, are displayed with the same avatar, e.g., assigned to the user who posted those comments.

An author of a secret is assigned a predetermined avatar that clearly indicates that a particular comment on the secret is from the author of the secret. In some embodiments, the avatar assigned to an author of any of the secrets is the same. That is, the avatar of a first author of a first secret is same as the avatar of a second author of a second secret. Further, the comment from an author can be visually distinct from that of other users. For example, a format such as a font, color, size, style, of the text of the comment of the author of a secret is different from that of the comments posted by other users. In the tenth GUI 1000, the author of the secret is assigned a "crown" avatar 1025. Accordingly, the comment 1020 from the author is displayed with the "crown" avatar 1025. Further, the text of the comment 1020 is italicized while the text of the comments from the other users are not. In some embodiments, the text is of a different color, e.g., blue, while the text of the comments from other users is in black.

In some embodiments, the list of avatars made available at the server 120 can be changed based on a specific time period. For example, Christmas-themed avatars may be made available during Christmas and the users may be assigned avatars from the Christmas-themed avatars.

Referring back to FIGS. 9 and 10, the ninth GUI 900 displays a secret 907 in a first portion 905 of the ninth GUI 900 and the comments 915 posted on the secret 907 in a second portion 910 of the ninth GUI 900. The first portion 905 has an image as a background to the secret 907. However, in another embodiments, the first portion 905 can have a colored backdrop as a background to the secret 907. The GUI may be rendered on a user device, e.g., a smartphone, associated with a user of the social networking application 150. In some embodiments, if the secret 907 has more comments than those displayed in the comments 915, the user may view those additional comments by maximizing the second portion 910 of the ninth GUI 900 to obtain the tenth GUI 1000 of FIG. 10, which shows more number of comments in comments 1015.

The ninth GUI 900 includes various GUI elements. For example, the first portion 905 of the ninth GUI 900 includes a comment GUI element 925 that indicates a number of comments received on the secret 907. In some embodiments, a comment GUI element can also be used to post a comment on a secret. For example, a comment GUI element such as the comment GUI element 215 of FIG. 2 can be used to post a comment on the first secret 205. On receiving a user selection of the comment GUI element 215, a GUI for posting a comment such as the ninth GUI 900 can be displayed. The user may then input the comment in a portion of the GUI such as third portion 950 of the ninth GUI 900.

The first portion 905 also includes a "heart" GUI element 930. The "heart" GUI element 930 indicates a number of hearts received on the secret 907, which indicates a number of users who "love" or "like" the secret 907. The "heart" GUI element 930 also facilitates a user to "love" or "like" the secret 907. In some embodiments, when the user "loves" or "likes" the secret 907 on his/her user device, the "heart" GUI element 930 can change in appearance. For example, when the "heart" GUI element 930 receives a "like" or "love," the color of the "heart" GUI element 930 may change from a first color to a second color, e.g., red, after receiving the "like" or "love." Various such visual appearance changes can be performed on the "heart" GUI element 930 to indicate to the user that the user has "loved" or "liked" the secret 907.

Each of the comments 915 in the second portion 910 of the ninth GUI 900 includes a comment "heart' GUI element such as comment "heart' GUI element 920. The comment "heart" GUI element 920 facilitates the user to "love" or "like" the comment with which the comment "heart" GUI element 920 is associated. A comment can also include a number of hearts GUI element 935 that indicates a number of users who have "liked" or "loved" the comment.

Figure 11A:
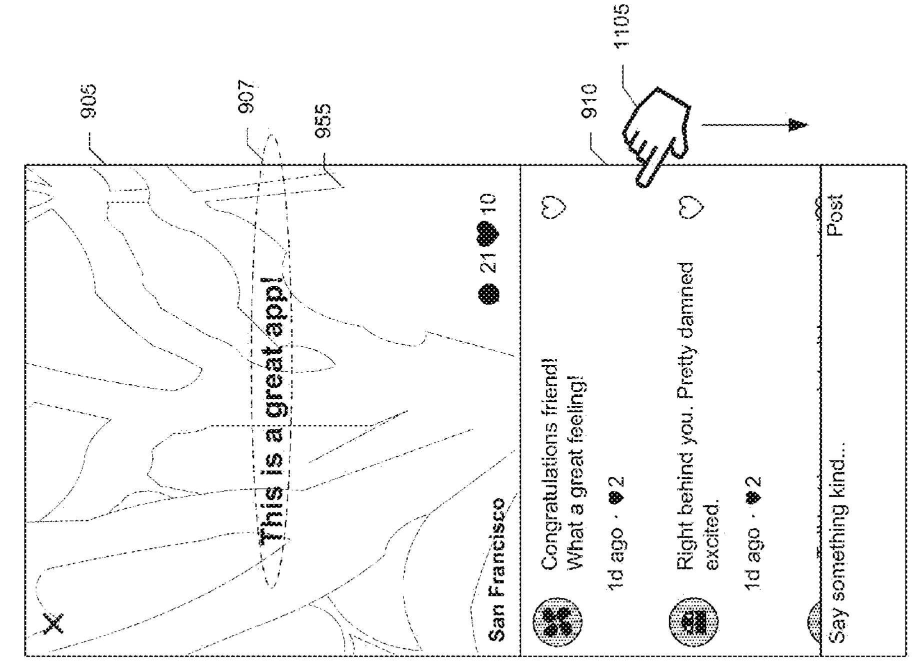
FIGS. 11A and 11B illustrate an example of a user interaction performed on a GUI of FIG. 9.
Figure 11B:
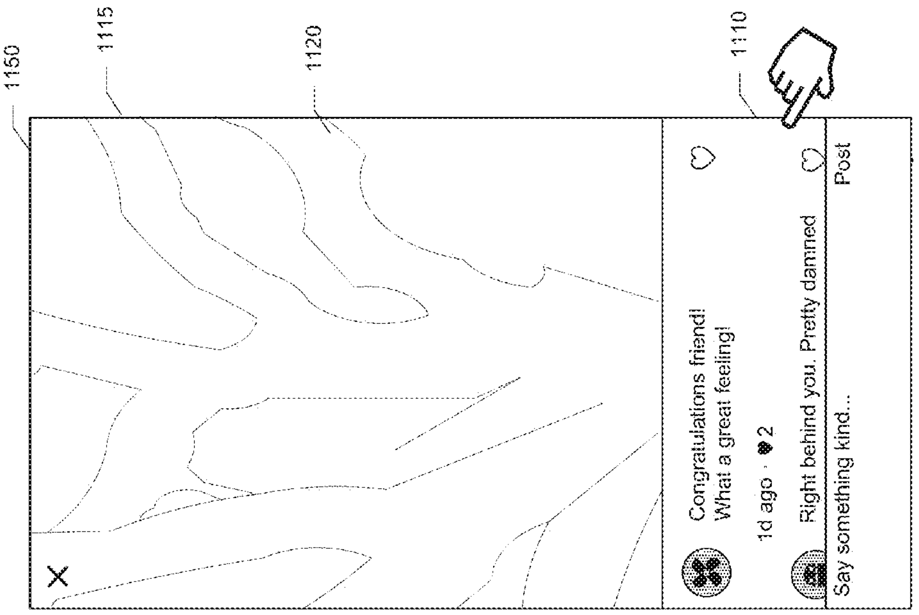

A number of user interactions can be performed on the ninth GUI 900. FIGS. 11A and 11B illustrate an example of a user interaction that can be performed on the ninth GUI 900. A user can perform a user interaction 1105 such as dragging the second portion 910 away from the first portion 905. For example, on a user device such as a smartphone, the user may drag the second portion 910 away from the first portion 905 using a swipe gesture. In some embodiments, while the user drags the second portion 910 away from the first portion 905 to result in the second portion 1110, the secret 907 displayed in the first portion 905 can disappear, as shown in the first portion 1115 of FIG. 11B. The user can view the background of the secret, e.g., image 955, without the secret 907 coming in the way of the background. In some embodiments, the other GUI elements from the first portion 905, such as comment GUI element 925 and a "heart" GUI element 930, also disappear.

Further, the dragging down of the second portion 910 can have a "rubber band" effect on the ninth GUI 900. That is, as the user drags the second portion 910 away from the first portion 905, the first portion 905 expands in size, e.g., occupies a larger real estate of the display of the user device, as shown by first portion 1115 of FIG. 11B. Also, a portion of the contents in the first portion 905 expands. For example, if the first portion 905 has an image 955 in the background, the image 955 expands, e.g., stretches outwards, to result in image 1120, as shown in first portion 1115 of FIG. 11B.

While the first portion 905 expands in size as the user drags the second portion 910 away from the first portion 905, the second portion 910 decreases in size, as shown by the second portion 1110 of FIG. 11B. When the user releases the second portion 1110, both the first portion 1115 and the second portion 1110 return to their original state, as shown by the first and second portions 905 and 910 of FIG. 11A, respectively.

Figure 12A:
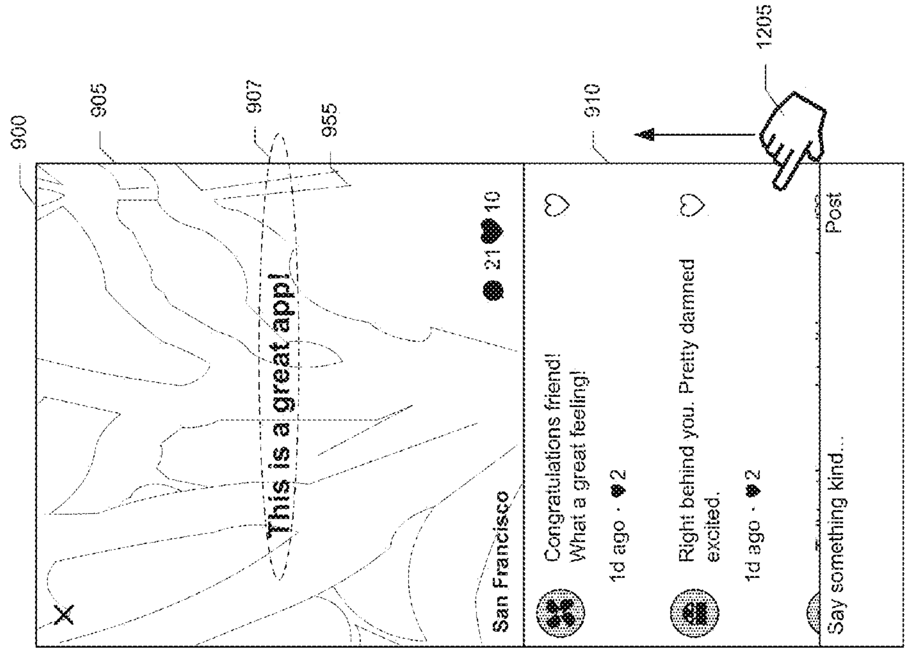
FIGS. 12A, 12B and 12C illustrate an example of another user interaction performed on the GUI of FIG. 9.
Figure 12B:
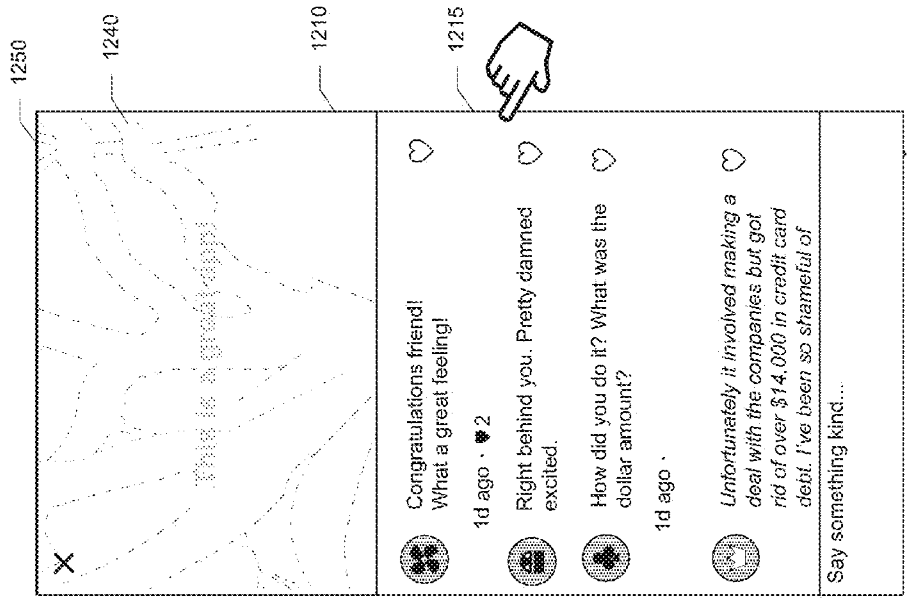
Figure 12C:
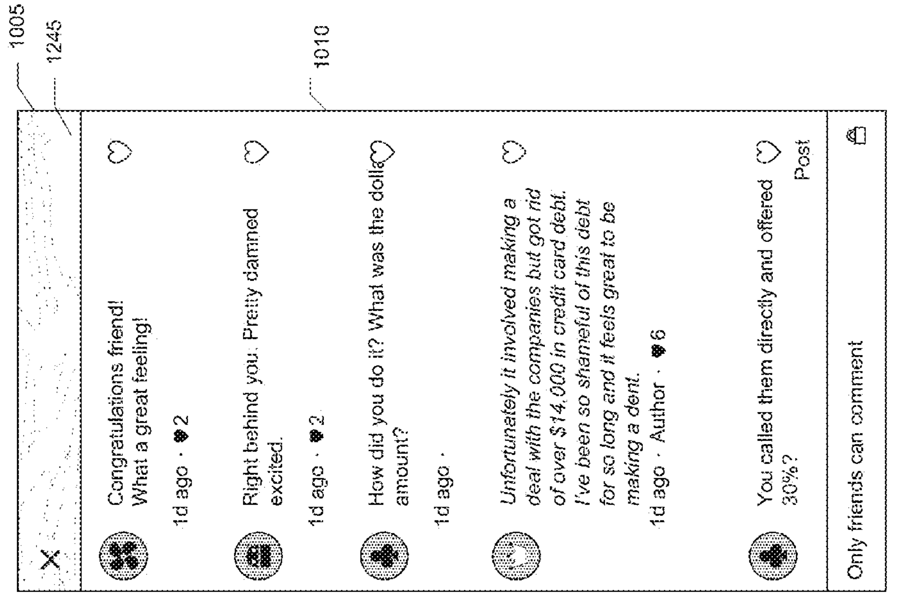

FIGS. 12A, 12B and 12C illustrate an example of a user interaction that can be performed on the ninth GUI 900. A user can perform a user interaction 1205 such as pushing the second portion 910 towards the first portion 905, e.g., to view more comments, as shown by the second portion 1010 in FIG. 12C. For example, on a user device such as a smartphone, the user may push the second portion 910 towards the first portion 905 using a swipe gesture. As the user pushes the second portion 910 towards the first portion 905, the first portion 905 continuously shrinks in area to first portion 1210 of the eleventh GUI 1250 and then collapses to form a strip-like first portion 1005, as shown in FIG. 12C. Simultaneously, the second portion 910 increases in area to form the second portion 1215 as shown in the eleventh GUI 1250 and then the second portion 1010 as shown in FIG. 12C while revealing an increasing number of comments.

Also, while the first portion 905 shrinks to the first portion 1005, the visual characteristics of the contents in the first portion 905 are progressively changed. For example, the image 955 and the secret 907 are progressively blurred, as shown by first content 1240 and second content 1245 in the eleventh GUI 1250 and the tenth GUI 1000, respectively.

In some embodiments, the comments 915 and the comments 1015 include a portion of the comments posted on the secret 907. The user may scroll the comments 1015 in the second portion 1010 to view any additional comments that are not initially displayed. In some embodiments, the comments 1015 displayed in the tenth GUI 1000 can include the comments 915 displayed in the ninth GUI 900. However, a number of the comments 1015 displayed in the tenth GUI 1000 can be more than that of the comments 915 displayed in the ninth GUI 900.

Figure 13:
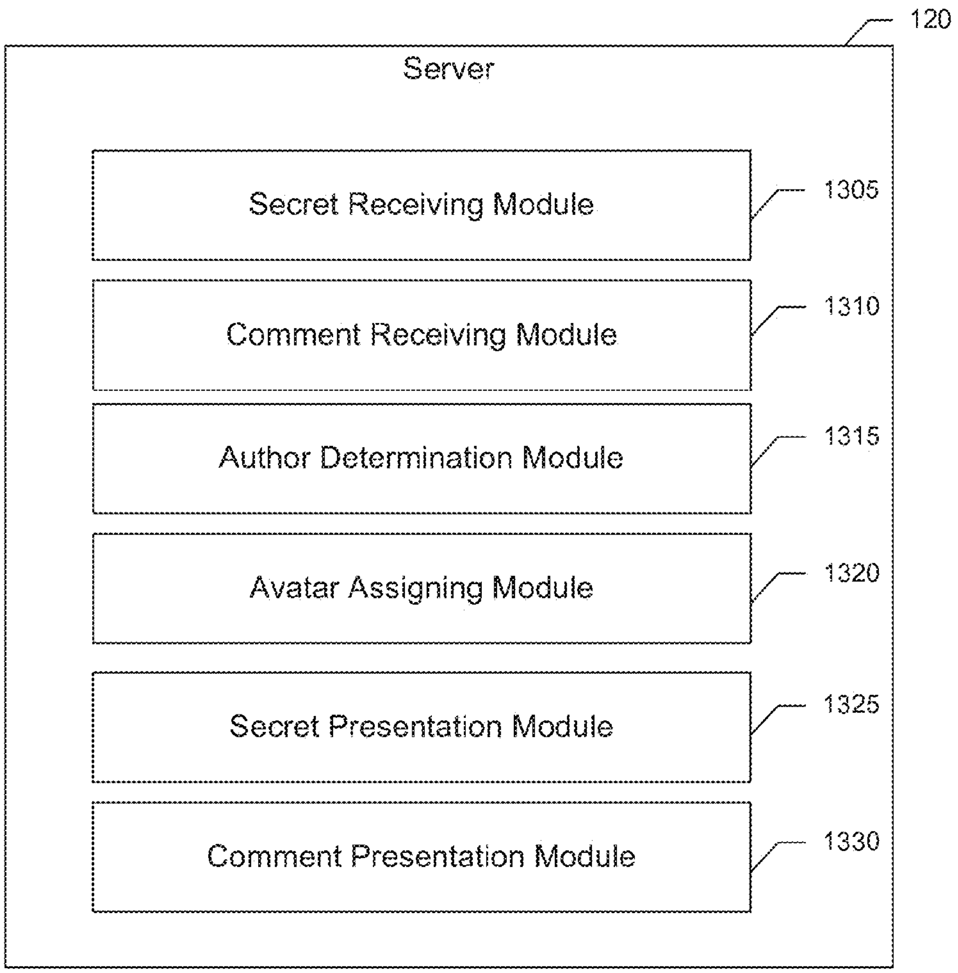
FIG. 13 is a block diagram of the server for facilitating displaying comments associated with a secret at a computing device of a user.

FIG. 13 is a block diagram of the server 120 for facilitating displaying comments associated with a secret at a computing device of a user. In some embodiments, at least a portion of the social networking application 150 can be realized/implemented using various modules of the server 120 depicted in FIG. 13. In some embodiments, the server 120 communicates with a portion of the social networking application 150 executing on the computing device, e.g., a social networking app, to receive and/or present a secret and comments on the secret. The server 120 includes a secret receiving module 1305 to receive a secret posted by the user. In some embodiments, the user posts the secret to the social networking application 150 via the social networking app. The secret receiving module 1305 can receive the secret from the social networking app. The server 120 includes a comment receiving module 1310 that receives comments posted on the secret from a number of users of the social networking application 150. In some embodiments, the users can post the comments on a secret via the social networking app. The comment receiving module 1310 can receive the comments from the social networking app executing on the computing devices associated with the users.

The server 120 includes an author determination module 1315 to determine if any of the comments are posted by an author of the secret. In some embodiments, the author determination module 1315 uses user information, such as email ID and/or phone number or a hashed version of the email ID and/or phone number of the user to determine if the comment is posted by an author of the secret. For example, the author determination module 1315 compares user information of the user who posted the comment with that of the author of the secret to determine if the comment is posted by the author. If the comment is posted by the author, the avatar assigning module 1320 assigns a predetermined avatar to the author and associates the comment posted by the author with the predetermined avatar. The predetermined avatar clearly indicates that a particular comment on the secret is from the author of the secret. In some embodiments, the avatar assigned to an author of any of the secrets is the same. Further, a user such as an administrator of the social networking application 150 can configure a particular avatar from the list of avatars available at the server 120, e.g., in the storage medium 125, as the avatar for an author of a secret.

The avatar assigning module 1320 assigns an unique avatar to each user who comments on a particular secret. That is, each user is assigned an avatar from the list of available avatars that is not already assigned to any of the users who have commented on the particular secret. However, in some embodiments, the avatars are unique to the users for the comments on the particular secret. That is, an avatar assigned to a user for posting comments on a first secret can be different from an avatar assigned to the user for posting comments on a second secret.

The avatars can be assigned based on an avatar selection policy. In some embodiments, the avatar selection policy is configured to assign a unique avatar to the user by selecting the avatar from the list of avatars in a random manner. For example, when a user comments on the particular secret for the first time, the social networking application 150 randomly selects an avatar from the list of avatars that is not already assigned to any of the users who have commented on the particular secret and assigns the randomly selected avatar to the user. The avatar assigning module 1320 associates each of the comments with an avatar assigned to the user who posted the corresponding comment.

The secret presentation module 1325 sends the secret to the computing devices of the users for further display. In some embodiments, the secret presentation module 1325 implements the delivery mechanism of the social networking application 150. As discussed above, at least with reference to FIG. 1, the delivery mechanism determines the list of users, e.g., friends of a user, to whom a particular secret posted by the user has to be transmitted to. The comment presentation module 1330 sends the comments on the secret to the computing devices of the users. In some embodiments, the secret and the comments on the secret are displayed via the social networking app executing on the computing device. Additional details with respect to the server 120 is described in the following paragraphs, at least with reference to FIGS. 15 and 16.

Figure 14:
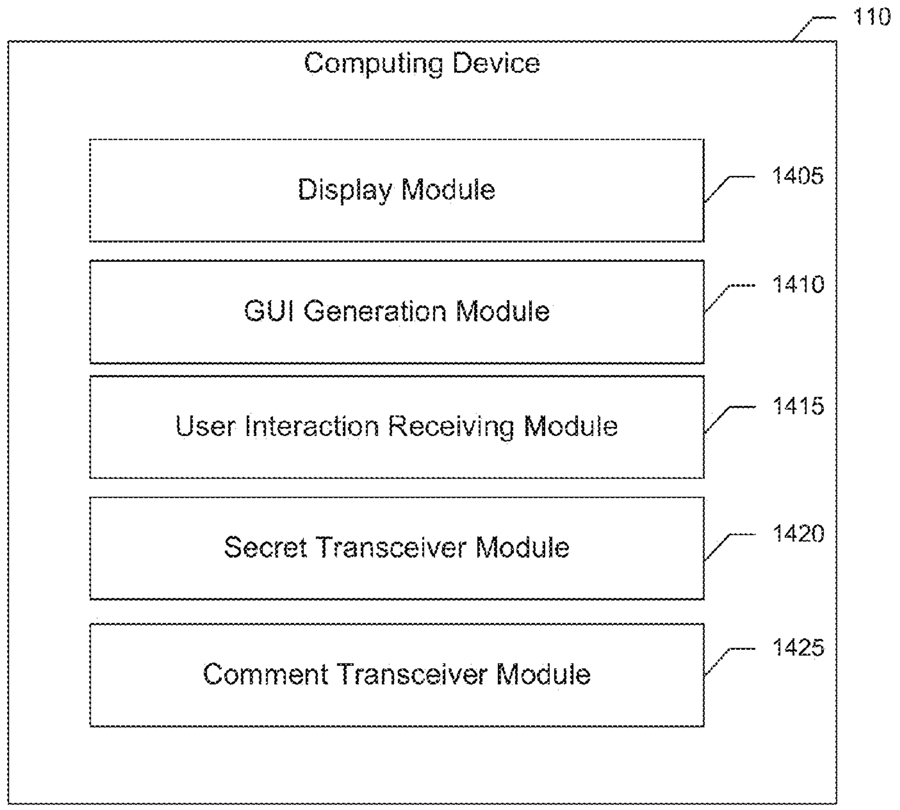
FIG. 14 is a block diagram of a computing device for generating a GUI to share a secret and comments on the secret with users of the social networking application.

FIG. 14 is a block diagram of a computing device 110 for generating a GUI to share a secret and comments on the secret with users of a social networking application 150. The computing device 110 can represent any of the computing devices 110*a-d* of FIG. 1. In some embodiments, the computing device 110 is similar to the computing device 110*a* and is associated with user 105*a*. In some embodiments, at least a portion of the social networking application 150, e.g., client portion or social networking apps, can be realized/implemented using various modules of the computing device 110.

The computing device 110 includes a GUI generation module 1410 that generates the GUI for sharing a secret and comments on the secret between the users 105*a-d*. In some embodiments, the GUI generation module 1410 generates a GUI for displaying a plurality of secrets. For example, the GUI generation module 1410 generates the first GUI 200 for displaying a plurality of secrets, including secrets 205 and 210. In some embodiments, the GUI generation module 1410 generates a GUI for displaying a secret and comments on the secret. For example, the GUI generation module 1410 generates the ninth GUI 900 for displaying a secret 907 and the comments, including comments 915, associated with the secret 907. In some embodiments, the secret is displayed in a first portion of the GUI and the comments on the secret in a second portion of the GUI. For example, the GUI generation module 1410 generates the ninth GUI 900 for displaying the secret in the first portion 905 of the ninth GUI 900 and the comments 915 of the secret 907 on the second portion 910.

The GUI generation module 1410 can also generate a GUI for the user 105*a* to post a comment on the secret. For example, the user 105*a* can comment on the secret 907 by inputting the comment in the third portion 950 of the ninth GUI 900. The computing device 110 includes a secret transceiver module 1420 to receive a secret input by the user 105*a* at the computing device 110. The secret transceiver module 1420 can also transmit the secret input by the user 105*a* to the server 120 for further transmission to other users of the social networking application 150, e.g., users 105*b-d*. The computing device 110 includes a comment transceiver module 1425 to receive comments from a user 105*a* for one or more secrets posted to the social networking application 150. The comment transceiver module 1425 can also transmit the comments input by the user 105*a* to the server 120 for further transmission to other users of the social networking application 150, e.g., users 105*b-d*.

The computing device 110 also includes an user interaction module 1415 that receives user selections or user interactions from the user 105*a*. The user interactions can result in a change to the GUI generated by the GUI generation module 1410, which can cause the GUI generation module 1410 to regenerate the GUI. For example, as described in association with FIGS. 11A-11B and 12A-12C, the user can perform operations such as drag or push a second portion 910 of the ninth GUI 900 away or towards the first portion 905 which results in regenerating the ninth GUI 900.

The computing device 110 includes a display module 1405 to display the GUI generated by the GUI generation module 1410 to the user 105*a*.

Figure 15:
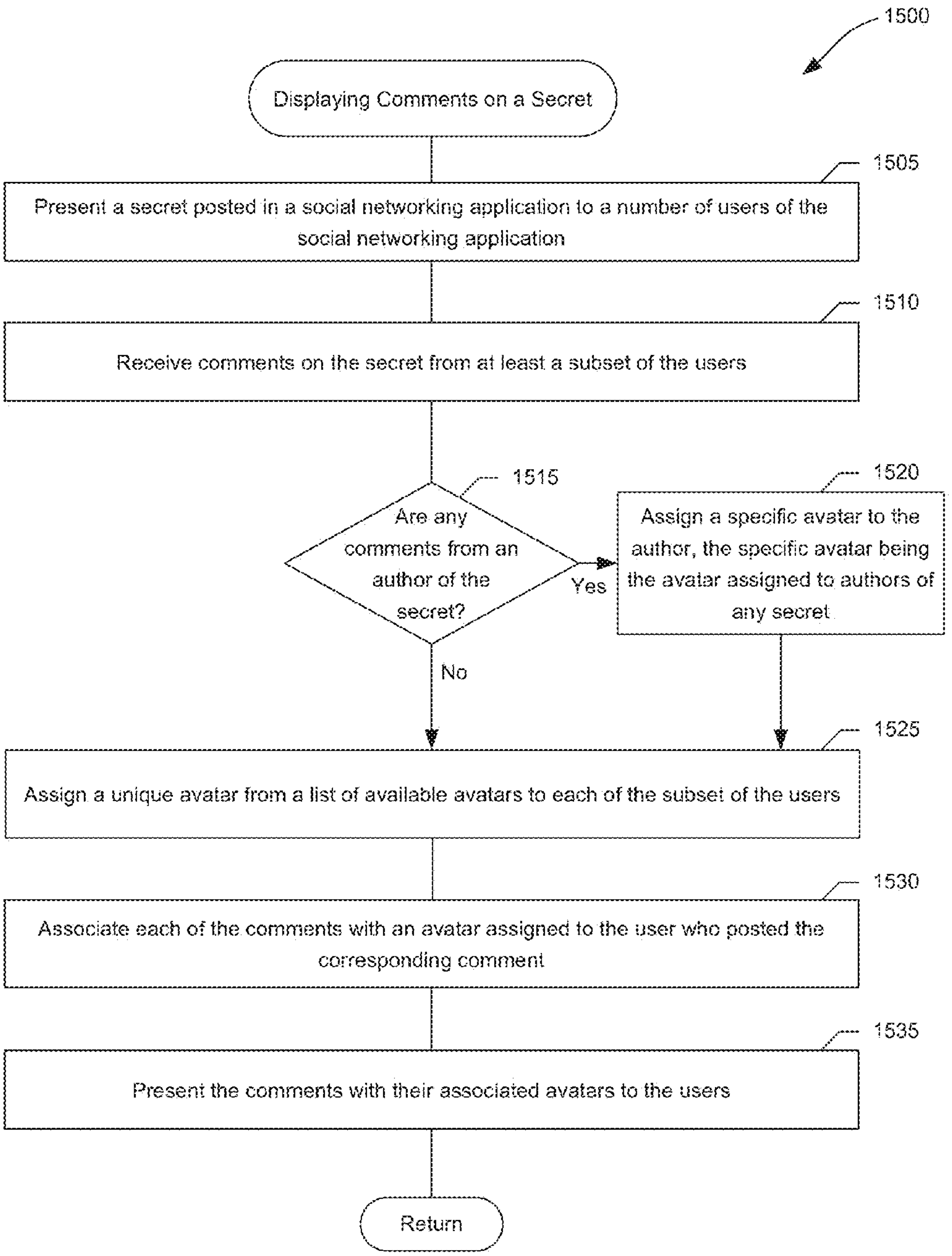
FIG. 15 is a flow diagram of a process for displaying comments posted on a secret in the social networking application.

FIG. 15 is a flow diagram of a process for displaying comments posted on a secret in a social networking application. In some embodiments, the process 1500 may be executed in the environment 100 of FIG. 1 and using the server 120. At block 1505, a secret presentation module 1325 presents a secret to a number of users of the social networking application 150. For example, the secret presentation module 1325 can transmit a secret 907 of FIG. 9 posted by a user 105*a* to the users 105*a-d*. The user 105*a* can post the secret via a social networking app executing on the computing device 110*a* associated with the user 105*a*. In some embodiments, the user 105*a* can post the secret via email, text message or a tweet.

At block 1510, the comment receiving module 1310 receives comments on the secret from a number of users, e.g., at least a subset of the users 105*a-d*. The users can post comments on the secret via the social networking apps executing on their corresponding computing devices.

At block 1515, the author determination module 1315 determines if any of the comments received on the secret are from the author of the secret. For example, the author determination module 1315 determines if any of the comments received for the secret 907 are posted by the user 105*a*, who is the author the secret 907. In some embodiments, the author determination module 1315 uses user information, such as email ID and/or phone number or a hashed version of the email ID and/or phone number of the user to determine if the comment is posted by an author of the secret. For example, the author determination module 1315 compares user information of the user who posted the comment with that of user 105*a* to determine if the comment is posted by the user 105*a*.

Responsive to a determination that one or more of the comments are posted by the author of the secret, at block 1520, the avatar assigning module 1320 assigns a predetermined avatar to the author and associates the one or more comments posted by the author with the predetermined avatar. The predetermined avatar clearly indicates that a particular comment on the secret is posted by the author of the secret. For example, the avatar assigning module 1320 assigns a crown avatar 1025 of FIG. 10 to the user 105*a* who is the author of the secret 907 for posting the comment 1020. In some embodiments, the avatar assigned to an author of any of the secrets is the same. After assigning the predetermined avatar to the author, the process 1500 proceeds to the block 1525.

Responsive to a determination that none of the comments are posted by the author of the secret, at block 1525, the avatar assigning module 1320 assigns an unique avatar to each user who has posted one or more comments on the secret. That is, each user is assigned an avatar from the list of available avatars that is not already assigned to any of the users who have commented on the secret. For example, the avatar assigning module 1320 assigns unique avatars 940 and 945 to two users who posted comments on the secret 907. However, in some embodiments, the avatars are unique to the users for the comments posted on a particular secret. That is, an avatar assigned to a user for posting comments on a first secret can be different from an avatar assigned to the user for posting comments on a second secret.

The avatars can be assigned to the users based on an avatar selection policy. In some embodiments, the avatar selection policy is configured to assign a unique avatar to the user by selecting the avatar from the list of avatars in a random manner. For example, when a user, e.g., user 105*b*, comments on the secret 907 for the first time, the social networking application 150 randomly selects an avatar, e.g., first avatar 940, from the list of avatars that is not already assigned to any of the users who have commented on the secret 907 and assigns the randomly selected avatar first 940 to the user 105*b*.

At block 1530, the avatar assigning module 1320 associates each of the comments posted on the secret with an avatar assigned to the user who posted the corresponding comment.

At block 1535, the comment presentation module 1330 presents the comments to the users 105*a-d* for display at their corresponding computing devices. For example, the comment presentation module 1330 can transmit the secret 907 and the comments, including comments 915, to the users 105*a-d*. When the users 105*a-d* view the comments in their computing devices 110*a-d*, the comments are displayed with the associated avatars.

Figure 16:
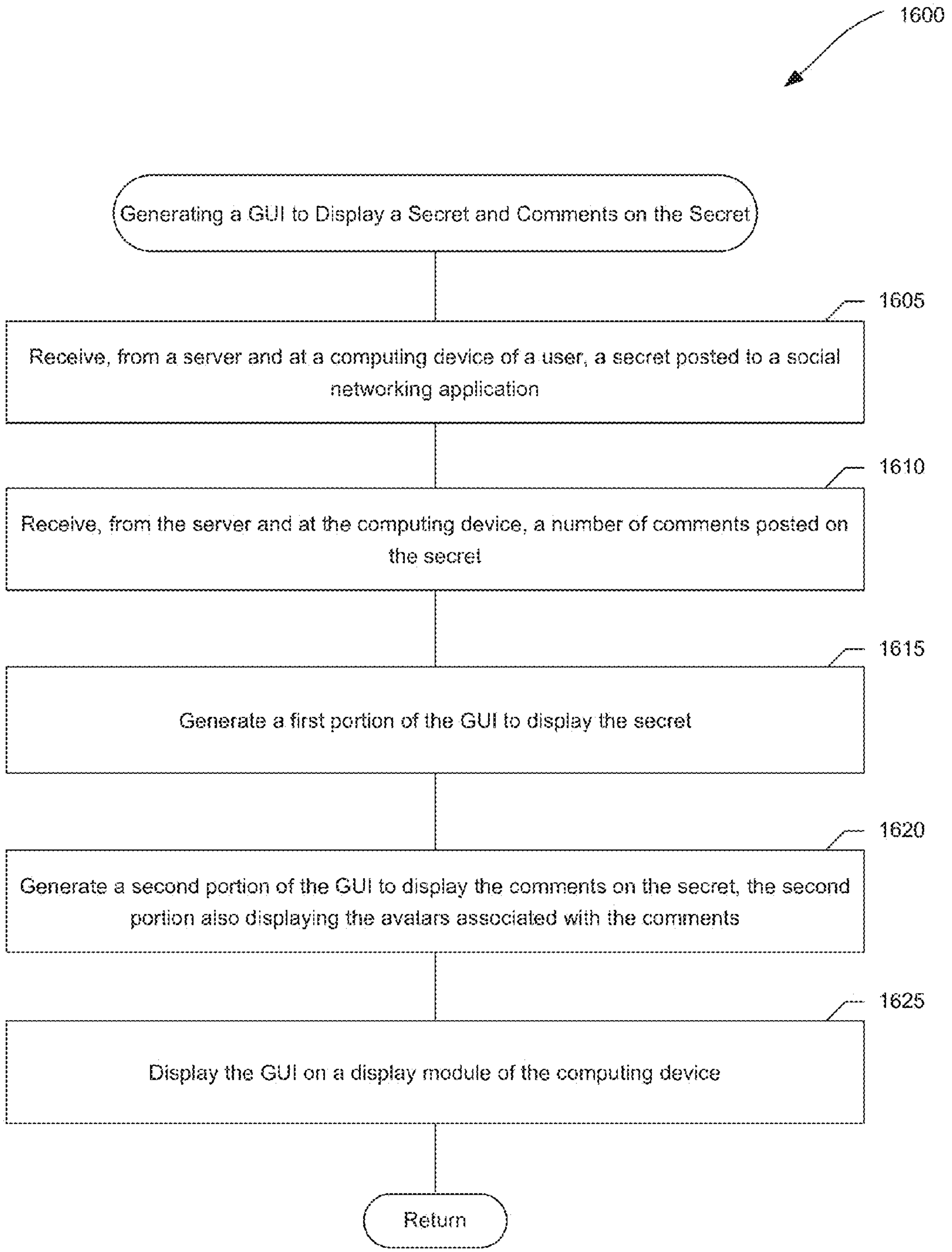
FIG. 16 is a flow diagram of a process for generating a GUI for displaying a secret and comments posted on the secret in the social networking application.

FIG. 16 is a flow diagram of a process for generating a GUI for displaying a secret and comments posted on the secret in a social networking application. In some embodiments, the process 1600 may be executed in the environment 100 of FIG. 1 and using the server 120 and the computing device 110. At block 1605, a secret transceiver module 1420 receives a secret posted by a user in the social networking application 150 from the server 120. For example, the computing device 110*b* receives the secret 907 posted by the user 105*a*.

At block 1610, the comment transceiver module 1425 receives the comments posted on the secret from the server 120. For example, the computing device 110*b* receives the comments, including comments 915, posted on the secret 907.

At block 1615, the GUI generation module 1410, generates a first portion of a GUI for displaying the secret received at block 1605. For example, the computing device 110*b* generates a first portion 905 of the ninth GUI 900 to display the secret 907.

At block 1620, the GUI generation module 1410, generates a second portion of the GUI for displaying the comments posted on the secret. The second portion of the GUI also displays the avatars associated with each of the comments. For example, the computing device 110*b* generates a second portion 910 of the ninth GUI 900 to display the comments 915 posted on the secret 907. The comments 915 also include avatars such as avatars 940 and 945.

At block 1625, the display module 1405 displays the GUI, including the first portion and the second portion. For example, the computing device 110*b* displays the ninth GUI 900 with the secret 907 in the first portion 905 and the comments (at least some) in the second portion 910.

Figure 17:
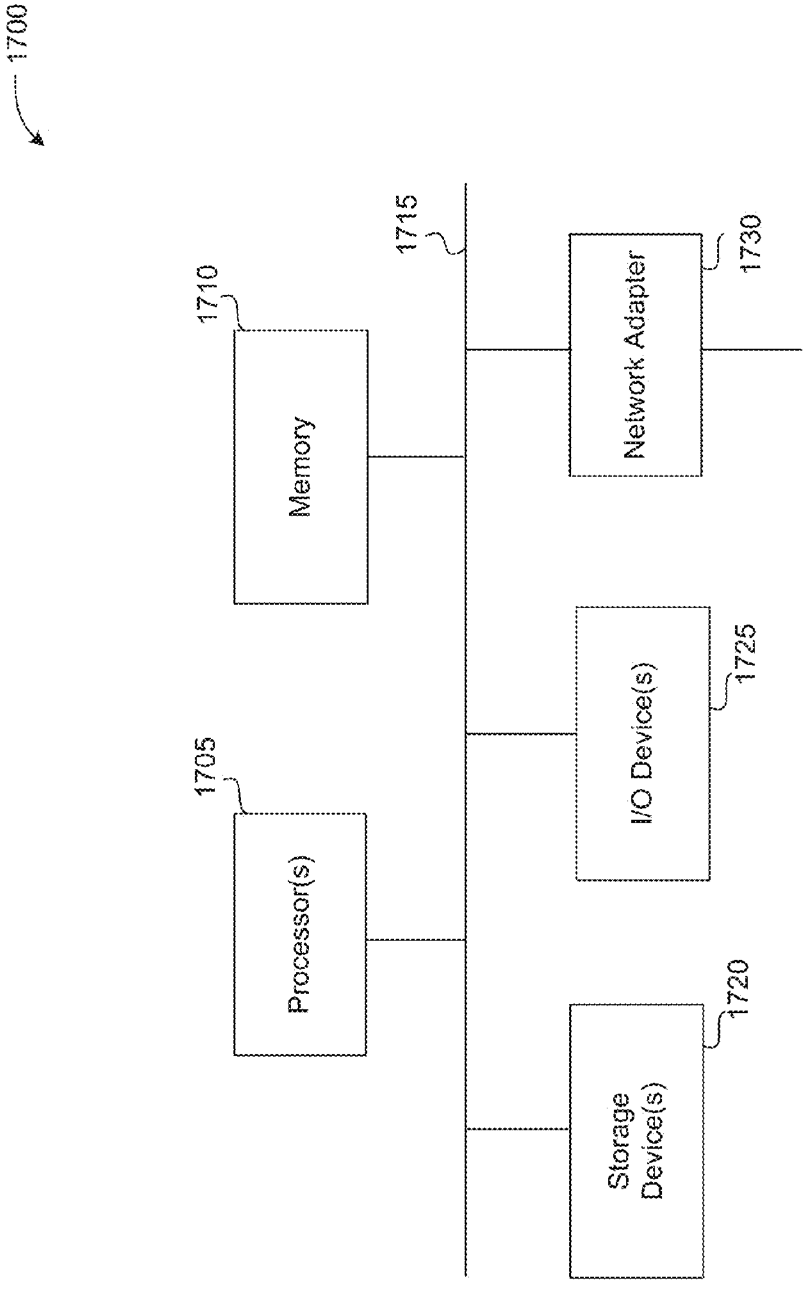
FIG. 17 is a block diagram of a computer system as may be used to implement features of some embodiments of the disclosed technology.

FIG. 17 is a block diagram of a computer system as may be used to implement features of some embodiments of the disclosed technology. The computing system 1700 may be used to implement any of the entities, components or services depicted in the examples of FIGS. 1-16 (and any other components described in this specification). The computing system 1700 may include one or more central processing units ("processors") 1705, memory 1710, input/output devices 1725 (e.g., keyboard and pointing devices, display devices), storage devices 1720 (e.g., disk drives), and network adapters 1730 (e.g., network interfaces) that are connected to an interconnect 1715. The interconnect 1715 is illustrated as an abstraction that represents any one or more separate physical buses, point to point connections, or both connected by appropriate bridges, adapters, or controllers. The interconnect 1715, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 1710 and storage devices 1720 are computer-readable storage media that may store instructions that implement at least portions of the described technology. In addition, the data structures and message structures may be stored or transmitted via a data transmission medium, such as a signal on a communications link. Various communications links may be used, such as the Internet, a local area network, a wide area network, or a point-to-point dial-up connection. Thus, computer-readable media can include computer-readable storage media (e.g., "non-transitory" media) and computer-readable transmission media.

The instructions stored in memory 1710 can be implemented as software and/or firmware to program the processor(s) 1705 to carry out actions described above. In some embodiments, such software or firmware may be initially provided to the computing system 1700 by downloading it from a remote system through the computing system 1700 (e.g., via network adapter 1730).

The technology introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of such phrases in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Terms that are used to describe the disclosure are discussed below, or elsewhere in the specification, to provide additional guidance to the practitioner regarding the description of the disclosure. For convenience, some terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for some terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Those skilled in the art will appreciate that the logic illustrated in each of the flow diagrams discussed above, may be altered in various ways. For example, the order of the logic may be rearranged, substeps may be performed in parallel, illustrated logic may be omitted; other logic may be included, etc.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

We claim:

1. A computer-implemented method for displaying a plurality of comments in a social networking application, the computer-implemented method comprising:
- presenting, by a server computer, a secret posted in the social networking application to a plurality of users, the users being members of the social networking application, one of the users being an author of the secret, the secret presented without revealing an identity of the author that causes the author to lose anonymity;
- receiving, at the server computer, the comments on the secret from a set of the users;
- determining, by the server computer, whether any of the comments are received from the author of the secret;
- responsive to a determination that a first set of the comments are received from the author of the secret,
  - assigning, by the server computer, an avatar to the author of the secret, wherein the server computer assigns a common avatar to different authors of different secrets,
  - associating, by the server computer, the first set of the comments with the avatar, and
  - presenting, by the server computer, the first set of the comments to the users with the avatar, the first set of the comments presented without revealing the identity of the author;
- assigning, by the server computer and based on an avatar selection policy, a unique avatar from a plurality of avatars available at the server computer to each of a subset of the set of the users to generate a set of the avatars, the subset of the set of the users excluding the author of the secret; and
- presenting, by the server computer, one or more of the comments from each of the subset of the set of the users with a specific avatar from the set of the avatars that is assigned to the corresponding user, the one or more of the comments presented without revealing an identity of the corresponding user that causes the corresponding user to lose anonymity.

2. The computer-implemented method of claim 1, wherein the secret includes at least one of a text, an image, an audio content, or video content.

3. The computer-implemented method of claim 1, wherein assigning the unique avatar to a user of the subset of the set of the users based on the avatar selection policy includes randomly selecting one of the avatars that is not already assigned to any of a remaining subset of the set of the users.

4. The computer-implemented method of claim 1, wherein assigning the unique avatar to a user of the subset of the set of the users based on the avatar selection policy includes:
- analyzing a comment of the comments posted by the user to determine a theme of the comment, and
- selecting a particular avatar from the avatars based on the theme, the particular avatar not already assigned to any of a remaining subset of the set of the users.

5. The computer-implemented method of claim 1, wherein assigning the unique avatar to a user of the subset of the set of the users based on the avatar selection policy includes:
- analyzing the secret posted by the author to determine a theme of the secret, and
- selecting a particular avatar from the avatars based on the theme, the particular avatar not already assigned to any of a remaining subset of the set of the users.

6. The computer-implemented method of claim 1, wherein the set of the avatars is unique for the subset of the set of the users for the comments posted on the secret, wherein the secret is one of a plurality of secrets on which the subset of the set of the users have commented.

7. The computer-implemented method of claim 1, wherein the avatars at the server computer include a first set of avatars that are made available for assignment to the users during a specific time period.

8. The computer-implemented method of claim 1, wherein the first set of the comments from the author are presented in a format that is visually distinct from the one or more of the comments from each of the subset of the set of the users.

9. A server computer for displaying a plurality of comments in a social networking application, the server computer comprising:

a processor;

a memory storing instructions which, when executed by the processor, causes:

a secret presentation module to present a secret posted in the social networking application to a plurality of users, the users being members of the social networking application, one of the users being an author of the secret, the secret presentation module further configured to present the secret to the users without revealing an identity of the author that causes the author to lose anonymity;

a comment receiving module to receive the comments on the secret from a subset of the users, the comments including a first comment from a first user of the users;

an author determination module to determine whether the first user is the author of the secret;

an avatar assigning module to responsive to a determination that the first user is the author of the secret, assign a specific avatar to the author of the secret, wherein the specific avatar is an avatar designated to be assigned to an author of any of a plurality of secrets, and associate the first comment with the specific avatar, responsive to a determination that the first user is not the author of the secret, assign a first avatar from a plurality of avatars to the first user, wherein each of the subset of the users who posted one or more of the comments on the secret is randomly assigned a unique avatar from the avatars, and associate the first comment with the first avatar; and a comment presentation module to present the first comment with an associated avatar to the users, the comment presentation module further configured to present the comments to the users without revealing an identity of the subset of the users that causes the subset of the users to lose anonymity.

10. The server computer of claim 9, wherein the avatar assigning module is configured to assign the unique avatar to a user of the subset of the users by randomly selecting one of the avatars that is not already assigned to any of a remaining of the subset of the users.

* * * * *

UNITED STATES PATENT AND TRADEMARK OFFICE

CERTIFICATE OF CORRECTION

PATENT NO. : 8,862,679 B1
APPLICATION NO. : 14/264946
DATED : October 14, 2014
INVENTOR(S) : David Byttow et al.

It is certified that error appears in the above-identified patent and that said Letters Patent is hereby corrected as shown below:

In the Specification

In column 7, line 24, delete "the a" and insert -- the --, therefor.

Signed and Sealed this
Seventeenth Day of February, 2015

Michelle K. Lee
*Deputy Director of the United States Patent and Trademark Office*